US007995236B2

(12) United States Patent
Hoshi et al.

(10) Patent No.: US 7,995,236 B2
(45) Date of Patent: Aug. 9, 2011

(54) PRINTER HAVING PLURAL SHEET FEEDING APPARATUSES WITH VARIABLE PRINT SPEEDS

(75) Inventors: Nobuyuki Hoshi, Shibata-gun (JP); Mituru Takahashi, Miyagi (JP)

(73) Assignee: Tohoku Ricoh Co., Ltd., Shibata-gun (JP)

( * ) Notice: Subject to any disclaimer, the term of this patent is extended or adjusted under 35 U.S.C. 154(b) by 1307 days.

(21) Appl. No.: 11/211,681

(22) Filed: Aug. 26, 2005

(65) Prior Publication Data

US 2006/0075909 A1 Apr. 13, 2006

(30) Foreign Application Priority Data

Oct. 13, 2004 (JP) ................................ 2004-298836
Oct. 28, 2004 (JP) ................................ 2004-314596

(51) Int. Cl.
*G06F 3/12* (2006.01)
*G03G 15/00* (2006.01)

(52) U.S. Cl. ............ 358/1.5; 358/1.15; 399/10; 399/80; 399/81; 399/82

(58) Field of Classification Search ................. 358/1.15, 358/1.16; 399/13, 15, 68, 23; 101/2, 90, 101/132
See application file for complete search history.

(56) References Cited

U.S. PATENT DOCUMENTS

| | | | | |
|---|---|---|---|---|
| 4,673,175 | A * | 6/1987 | Morita | 271/10.03 |
| 5,279,217 | A * | 1/1994 | Ueda et al. | 101/2 |
| 5,386,284 | A * | 1/1995 | Kasahara et al. | 399/45 |
| 5,517,913 | A | 5/1996 | Oshio et al. | |
| 5,524,542 | A * | 6/1996 | Toyama | 101/485 |
| 5,537,920 | A | 7/1996 | Hasegawa et al. | |
| 6,298,778 | B1 * | 10/2001 | Onodera et al. | 101/232 |
| 6,965,444 | B1 * | 11/2005 | Shimada et al. | 358/1.15 |
| 7,139,085 | B1 * | 11/2006 | Sakaguchi | 358/1.15 |
| 2001/0036379 | A1 * | 11/2001 | Takahashi et al. | 399/401 |
| 2003/0050971 | A1 * | 3/2003 | Okuyama et al. | 709/203 |
| 2004/0161275 | A1 * | 8/2004 | Hirose | 400/61 |
| 2004/0184058 | A1 * | 9/2004 | Miyajima | 358/1.12 |
| 2004/0194649 | A1 * | 10/2004 | Watanabe et al. | 101/118 |

FOREIGN PATENT DOCUMENTS

| | | |
|---|---|---|
| JP | 5-318899 | 12/1993 |
| JP | 6-199028 | 7/1994 |
| JP | 6-247027 | 9/1994 |
| JP | 7-10366 | 1/1995 |

(Continued)

OTHER PUBLICATIONS

Office Action issued Oct. 5, 2010, in Japan Patent Application No. 2004-314596.

*Primary Examiner* — Benny Q Tieu
*Assistant Examiner* — Haris Sabah
(74) *Attorney, Agent, or Firm* — Oblon, Spivak, McClelland, Maier & Neustadt, L.L.P.

(57) ABSTRACT

A printer of the present invention allows a plurality of sheet feeding apparatuses, each having a particular sheet feed speed range adaptive to a plurality of print speeds, to be selectively connected thereto. When any one of the sheet feeding apparatuses is connected to the printer, a controller automatically sets a print speed range on the printer in accordance with print speed range information corresponding to the sheet feeding apparatus.

2 Claims, 19 Drawing Sheets

FOREIGN PATENT DOCUMENTS

| | | |
|---|---|---|
| JP | 8-72380 | 3/1996 |
| JP | 8-164600 | 6/1996 |
| JP | 9-11597 | 1/1997 |
| JP | 3236064 | 9/2001 |
| JP | 2002-53233 | 2/2002 |
| JP | 2004-167806 | 6/2004 |
| JP | 2004-255585 | 9/2004 |

* cited by examiner

PRINTER HAVING PLURAL SHEET FEEDING APPARATUSES WITH VARIABLE PRINT SPEEDS

BACKGROUND OF THE INVENTION

1. Field of the Invention

The present invention relates to a stencil printer or similar printer and more particularly to a sheet feeding apparatus and a sheet discharging apparatus selectively connectable to a printer and capable of conveying paper sheets or similar recording media at a variable speed adaptive to a plurality of print speeds available with the printer.

2. Description of the Background Art

Conventional printers, including stencil printers, include a printer of the type allowing various kinds of peripheral units or apparatuses to be selectively connected thereto. Typical of peripheral units are a multi-tray sheet discharging apparatus configured to distribute paper sheets or similar recording media, which are prints carrying an image thereon each and sequentially driven out of a printer body, to a plurality of trays and a mass sheet feeding apparatus and a mass sheet discharging apparatus configured to feed and discharge, respectively, a great amount of paper sheets. Such peripheral units each are provided with a particular sheet feed speed or sheet discharge speed matching the respective property. Generally, the sheet feed speed and sheet discharge speed are selected to be adaptive to a plurality of print speeds available with a printer.

However, some peripheral units are not adaptive to higher print speeds required of modern printers, so that sheet jams ascribable to sheet feed errors or sheet discharge errors are apt to occur. Further, whether or not the print speed of the printer body is adequate cannot be determined unless a peripheral unit is connected to and operated with the printer body, forcing the operator of the printer to set the optimum print speed by hand.

For example, it is a common practice with a stencil printer to mount a first or body sheet feeding apparatus on the printer and connect a second or multi-tray sheet feeding apparatus (sheet bank) to the printer. In this configuration, the operator of the printer is allowed to select either one of the first and second sheet feeding apparatuses and a desired print speed on a control panel. Sheet feed speeds available with the first and second sheet feeding apparatuses are sometimes different from each other, e.g., the former and the latter are respectively a hundred and thirty paper sheets and a hundred and twenty paper sheets for a minute that correspond to the sixth and fifth print speeds, respectively.

Assume that the operator selects the sixth print speed of the printer, i.e., a hundred and thirty paper sheets for a minute on the control panel and then selects the second sheet feeding apparatus in accordance with the size of paper sheets to use. Then, the sheet feed speed of the second sheet feeding apparatus, which is a hundred and twenty paper sheets for a minute, is lower than the print speed, resulting in a sheet jam in the sheet feeding apparatus. Stated another way, the operator recognizes the mismatch of the sheet feed speed and print speed only after the sheet jam occurred in the sheet feeding apparatus and then replaces the sixth print speed with the fifth print speed. This not only requires the operator to perform troublesome jam processing, but also wastes time and paper sheets.

On the other hand, assume that the operator initially selects the fifth print speed matching the second or multi-tray sheet feeding apparatus in accordance with the sheet size to use, changes the second sheet feeding apparatus to the first sheet feeding apparatus before the start of printing, stacks paper sheets on the first sheet feeding apparatus, and then causes the printer to start operating. Then, the printer starts operating at the fifth print speed, i.e., a hundred and twenty paper sheets for a minute initially set. This brings about a problem that the sixth print speed, i.e., a hundred and thirty paper sheets for a minute matching the first sheet feeding apparatus is simply wasted. Although the operator, forgotten to reconfirm the print speed after changing the sheet feeding apparatus, may be responsible for such an occurrence, it is harsh to blame only the operator regarding the reconfirmation.

Japanese Patent No. 3,236,064 (corresponding U.S. Pat. No. 5,279,217) discloses a printer configured to control print speed to preselected one in matching relation to the type of a sheet discharging apparatus connected to the printer. While this printer, matching its print speed to the sheet discharging apparatus, successfully obviates sheet jams as far as the sheet discharge side is concerned, the print speed thus matched to the sheet discharging apparatus cannot be varied.

Technologies relating to the present invention are also disclosed in, e.g., Japanese Patent Laid-Open Publication Nos. 6-199028 (corresponding U.S. Pat. No. 5,517,913), 6-247027 (corresponding U.S. Pat. No. 5,537,920), 9-11597 and 2004-167806

SUMMARY OF THE INVENTION

It is an object of the present invention to provide a printer capable of obviating the mismatch of a print speed selected and the sheet feed speed of a sheet feeding apparatus selected.

It is another object of the present invention to provide a printer capable of surely operating at the highest speed available therewith without requiring the operator of the printer to reconfirm a sheet feed speed after changing it.

It is a further object of the present invention to provide a printer capable of selecting a print speed range adequate for a sheet feeding or a sheet discharging apparatus connected thereto, thereby insuring stable sheet feed or sheet discharge while promoting easy operation.

A printer of the present invention allows a plurality of sheet feeding apparatuses, each having a particular number of sheet feed speeds, to be selectively connected thereto. The printer includes an apparatus selecting/changing device for allowing any one of the plurality of sheet feeding apparatuses to be selected or changed, a print speed display, a print speed selecting/changing device for allowing any one of a plurality of print speeds to be selected or changed, and a controller for displaying on the print speed display a print speed matching the highest sheet feed speed available with the sheet feeding apparatus selected.

Also, a printer of the present invention allows a plurality of sheet discharging apparatuses, each having a particular sheet feed speed range adaptive to a plurality of print speeds, to be selectively connected thereto. The printer includes a storage for storing beforehand print speed range information each matching the sheet feed speed range of a particular sheet discharging apparatus, and a controller for selecting, when any one of the sheet discharging apparatuses is connected to the printer, the print speed range of the printer in accordance with the print speed range information corresponding to the sheet discharging apparatus connected to the printer.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
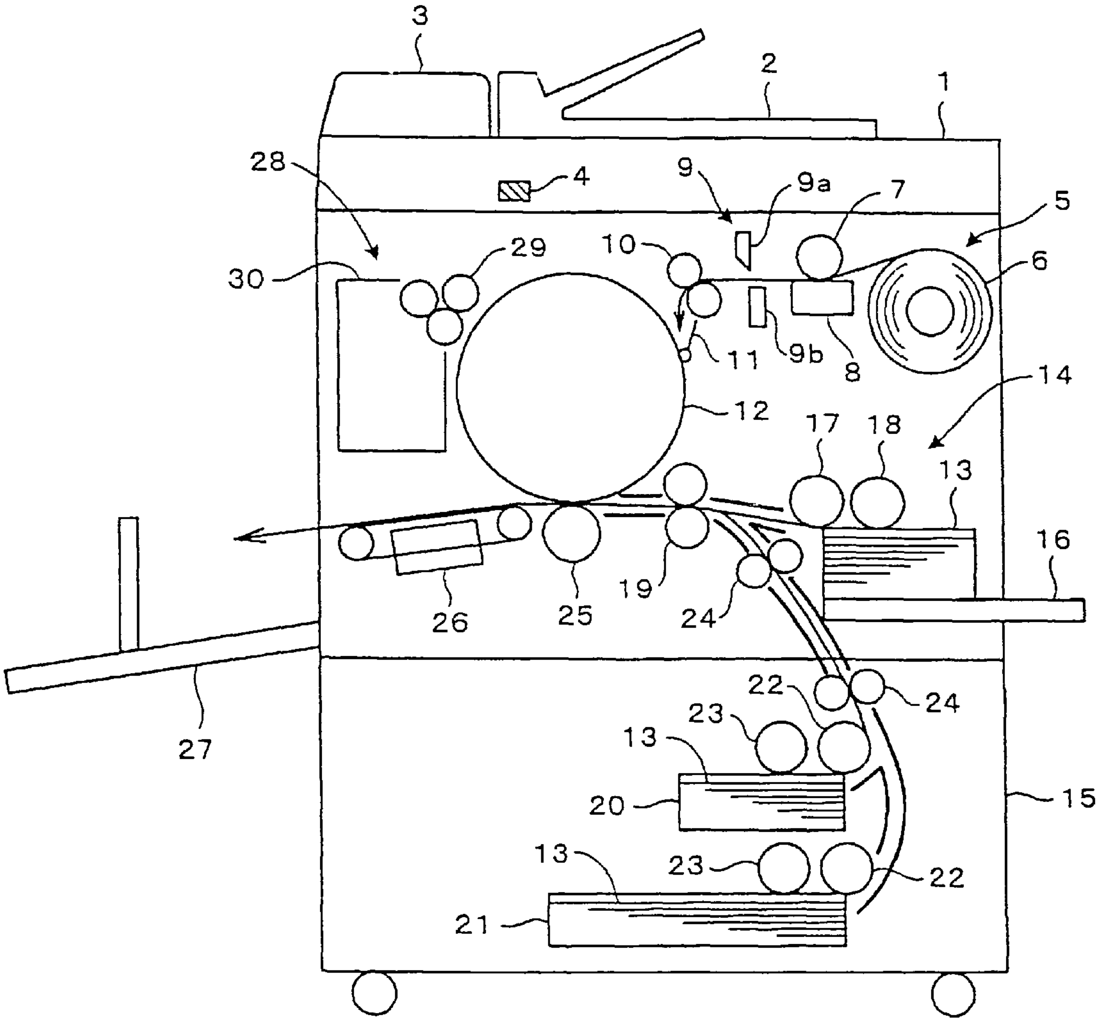
FIG. 1 is a front view showing the general construction of a first embodiment of the printer in accordance with the present invention and implemented as a stencil printer.

Preferred embodiments of the printer in accordance with the present invention will be described hereinafter. It is to be noted that reference numerals used in each embodiment are independent of reference numerals of the other embodiments, i.e., the same reference numerals do not always designate the same structural elements. Also, structural elements provided in pair and not needing distinction are represented by only one of them for the simplicity of description. Parenthesized reference numerals designate structural elements taught in, e.g., Japanese patent laid-open publications.

First Embodiment

Referring to FIGS. 1 through 4, a first embodiment of the printer in accordance with the present invention is shown and implemented as a stencil printer by way of example. As shown, the printer includes a scanner or document reading device 1, a cover plate 2 positioned above the scanner 1 and openable upward away from the scanner 1, and an ADF (Automatic Document Feeder) 3 also positioned above the scanner 1 for automatically feeding a plurality of documents one by one. A sheet size sensor 4 is disposed in the scanner 1 for sensing the size of a document.

In a master making section 5, a platen roller 7 is rotated to convey a stencil 6 paid out from a stencil roll while pressing it against a thermal head 8, so that the stencil 6 is perforated, or cut, in accordance with image data. A roller pair 10 conveys the stencil 6 being perforated toward a damper 11 mounted on a print drum 12. After the leading edge of the stencil 6 has been clamped by the clamper 11, the stencil 6 is wrapped around the print drum 12 in accordance with the rotation of the print drum 12. A cutter 9, made up of an upper edge 9*a* and a lower edge 9*b*, cuts the stencil 6 at a preselected length to thereby produce a so-called master.

Paper sheet or similar recording media 14 are sequentially fed from either one of a first sheet feeding apparatus 14 arranged in the printer body and a second sheet feeding apparatus or sheet bank 15 positioned below the printer body. The first sheet feeding apparatus 14 includes an elevatable sheet tray 16 loaded with a stack of sheets, a feed roller 17 and a pickup roller 18. The feed roller 17 and pickup roller 18 cooperate to pay out the top paper sheet 13 from the tray 16 toward a registration roller pair 19 via a roller pair 14 while separating it from the other or underlying paper sheets.

In the illustrative embodiment, the first sheet feeding apparatus 14 is selectively operable at any one of six incremental sheet feed speeds, i.e., a first speed for feeding sixty paper sheets for a minute, a second speed for feeding seventy-five paper sheets for a minute, a third speed for feeding ninety paper sheets for a minute, a forth speed for feeding a hundred and five paper sheets for a minute, a fifth speed for feeding a hundred and twenty paper sheets for a minute, and a sixth speed for feeding a hundred and thirty paper sheets for a minute. The first to sixth speeds each correspond to a particular print speed, as will be described specifically later.

The second sheet feeding apparatus 15 includes two sheet cassettes 20 and 21 and feed rollers 22 and pickup rollers 23 respectively assigned to the sheet cassettes 20 and 21. The feed roller 22 and pickup roller 23 assigned to each sheet cassette 20 or 21 cooperate to pay out the top paper sheet 13 from the sheet cassette toward the registration roller pair 19 via a roller pair 24 while separating it from the other or underlying paper sheets. In the illustrative embodiment, the second sheet feeding apparatus 15 is selectively operable at anyone of five incremental sheet feed speeds, i.e., a first, a second, a third, a forth and a fifth speed for feeding sixty paper sheets, seventy-five paper sheets, ninety paper sheets, a hundred and five paper sheets and a hundred and twenty paper sheets, respectively, for a minute. These speeds also correspond to a particular print speed each.

The registration roller pair 19 stops the paper sheet 13 fed from the first or the second sheet feeding apparatus 14 or 15, respectively, in order to correct the skew of the paper sheet 13 and again conveys it toward a print position between the print drum 12 and a press roller or pressing means 25 at preselected timing.

At the print position, the press roller 25 presses the paper sheet 13 against the print drum 12. As a result, ink, fed from ink feeding means, not shown, disposed in the print drum 12, is transferred to the paper sheet 13 via the porous portion of the print drum 12 and perforations of the master 6, forming an image on the paper sheet 13.

The paper sheet or print 13, thus carrying the image thereon, is conveyed by a sheet conveyor 26 to a print tray 27 while having its back sucked by a suction fan, not shown, included in the sheet conveyor 26. In this manner, consecutive prints are sequentially stacked on the print tray 27. On the other hand, the used master 6 is peeled off from the print drum 12 by a peel roller pair 29 included in a master discharging section 28 and collected in a waste master box 30 thereby.

Figure 2:
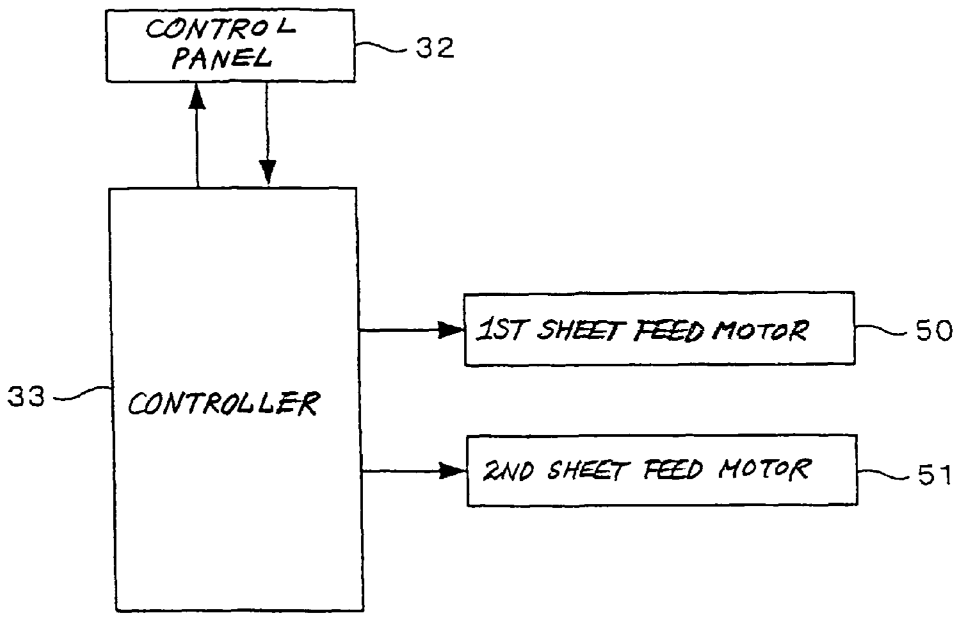
FIG. 2 is a schematic block diagram showing a control system included in the first embodiment.

FIG. 2 is a schematic block diagram showing a control system included in the illustrative embodiment. As shown, the control system includes a controller or control means 33 connected to a control panel 32 and a first and a second sheet feed motor 50 and 51, respectively, that drive the first and second sheet feeding apparatuses 14 and 15, respectively. The controller 33 is implemented as a microcomputer including an I/O (Input/Output) interface, a CPU (Central Processing Unit), a ROM (Read Only Memory) and a RAM (Random Access Memory) although not shown specifically. When the operator of the printer inputs desired information on the operation panel 32, the controller 33 controls the first or the second sheet feed motor 50 or 51 via a speed gearing, not shown, in accordance with the above information, thereby causing the first or the second sheet feeding apparatus 14 or 15, respectively, to operate at a designated speed.

Figure 3:
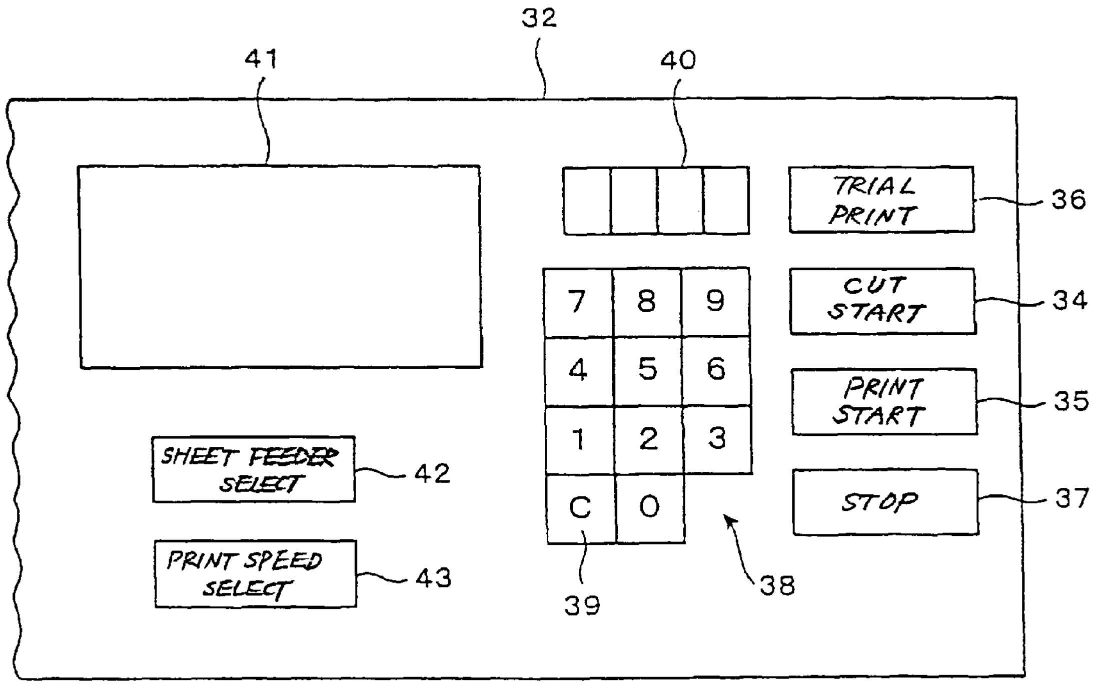
FIG. 3 is a fragmentary plan view showing a specific configuration of a control panel also included in the illustrative embodiment.

A specific configuration of the control panel 32 is shown in FIG. 3. As shown, the control panel 32 includes a cut or perforation start key 34, a print start key 35, a trial print key 36, a stop key 37, ten keys 38, a clear key 39, an indicator 40 implemented by seven-segment LEDs (Light Emitting Diodes), a display or print speed displaying means 41 implemented by an LCD (Liquid Crystal Display) panel, a sheet feeder select key 42, and a print speed select key or print speed selecting/changing means 43.

The indicator 40 indicates various kinds of numerical values while the display 41 displays various kinds of information with a hierarchical structure.

In FIG. 3, when the operator presses the sheet feeder select key 42, the display 41 displays the first and second sheet feeding apparatuses 14 and 15 and urges the operator to select either one of them on the display 41. In more detail, the second sheet feeding apparatus 15 is made up of two sheet cassettes 20 and 21 and allows either one of them to be selected. The operator may change the sheet feeding apparatus selected on the display 41 to the other sheet feeding apparatus by pressing the clear key 39 and again touching the sheet feeder select key 42, as desired. In this sense, the sheet feeder select key 42 and display. 41 constitute apparatus selecting/changing means in combination.

When the operator presses the print speed select key 43, the display 41 displays six incremental print speeds, i.e., a first, a second, a third, a fourth, a fifth and a sixth print speed for producing sixty prints, seventy-five prints, ninety prints, a hundred and five prints, a hundred and twenty prints and a hundred and thirty prints, respectively, for a minute. The operator, watching the display 41, is capable of selecting desires one of the first to sixth print speeds on the display 41. The operator may change the print speed once selected on the display 41 to any other print speed by pressing the clear key 39 and again touching the print speed select key 43, as desired.

Figure 4:
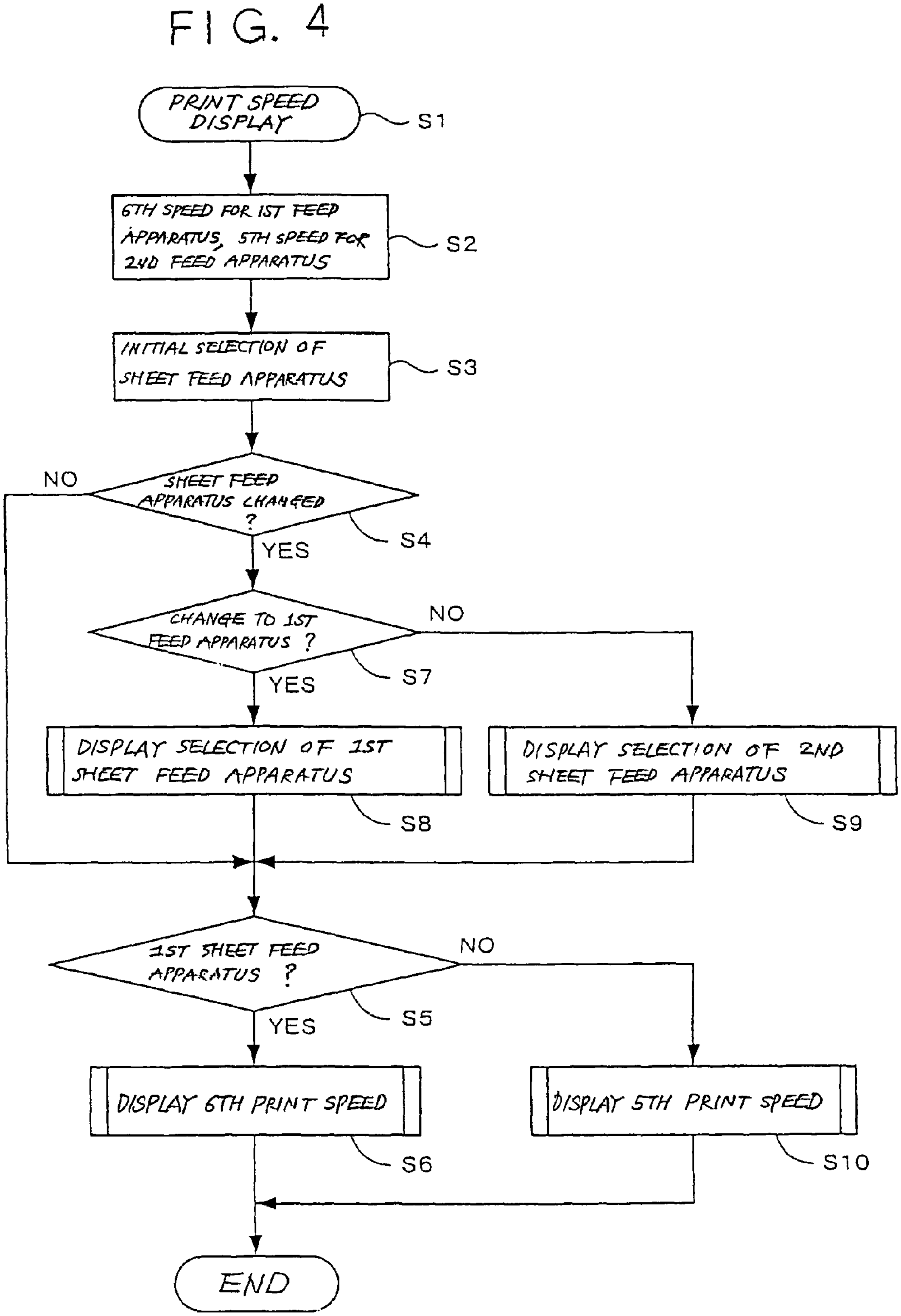
FIG. 4 is a flowchart demonstrating a specific control procedure to be executed by the first embodiment.

Reference will be made to FIG. 4 for describing a specific operation of the illustrative embodiment, i.e., the controller 33. The operation to be described obviates the mismatch of a set print speed and a sheet feed speed available with a sheet feeding apparatus selected. As shown, when the operator turns on the power, a print speed selected last time or a default print speed appears on the display 41 (step S1). More specifically, the print speed to appear on the display 41 is the sixth or highest print speed for the first sheet feeding apparatus 14 whose capacity is 130 sheets for a minute or is the fifth print speed for the second sheet feeding apparatus 15 whose ability is a hundred and twenty sheets for a minute (step S2). At the initial setting stage, the operator selects the first or the second sheet feeding apparatus 14 or 15, respectively, on the control panel 32 (step S3).

After the step S3, the controller 33 determines whether or not the operator has changed the sheet feeding apparatus (step S4). If the answer of the step S4 is negative (NO), then the controller 33 determines whether or not the sheet feeding apparatus is the first apparatus 14 (step S5). If the answer of the step S5 is positive (YES), the controller 33 displays the sixth print speed on the display 41 of the control panel 32 (step S6). Alternatively, the six incremental print speeds available with the illustrative embodiment may be displayed on the control panel 32 together with or in place of the sixth print speed in the number of prints for a minute or unit time. This is also true with the other procedures to be described later.

Subsequently, the operator presses the print speed select key 43 in order to select desired one of the first to sixth print speeds. The operator, however, does not have to press the key 43 if the print speed displayed in the step Si is desired one and lies between the first print speed and the sixth print speed.

If the answer of the step S4 is YES, meaning that the operator has changed the sheet feeding apparatus, then the controller 33 determines whether or not the sheet feeding apparatus newly selected is the first apparatus 14 (step S7). If the answer of the step S7 is YES, the controller 33 displays on the display 41 a message showing that the first sheet feeding apparatus 14 is selected (S8). Subsequently, the controller 33 again determines whether or not the sheet feeding apparatus is the first apparatus 14 (step S5) and displays, if the answer of the step S5 is YES, the sixth print speed on the display 41 (step S6).

On the other hand, if the answer of the step S7 is NO, meaning that the first sheet feeding apparatus 14 is not selected, then the controller 33 displays on the display 41 a message showing that that the second sheet feeding apparatus 15 is selected (S9). The step S9 is also followed by the step S5. If the answer of the step S5 is NO, then the controller 33 displays the fifth print speed on the display 41.

Subsequently, the operator presses the print speed select key 43 in order to select desired one of the first to fifth print speeds. Again, the operator does not have to press the key 43 if the print speed displayed in the step Si is desired one and lies between the first print speed and the fifth print speed.

By executing the above control over the display of a print speed, the illustrative embodiment is capable of obviating sheet jams ascribable to the mismatch of a set print speed and the sheet feed speed of a sheet feeding apparatus selected.

A modification of the illustrative embodiment will be described hereinafter with reference to FIG. 5. The modification is practicable with the same construction as the illustrative embodiment, so that the following description will concentrate on portions unique to the modification. Briefly, the modification is configured to execute printing at the highest available speed even when the sheet feeding apparatus is changed.

Figure 5:
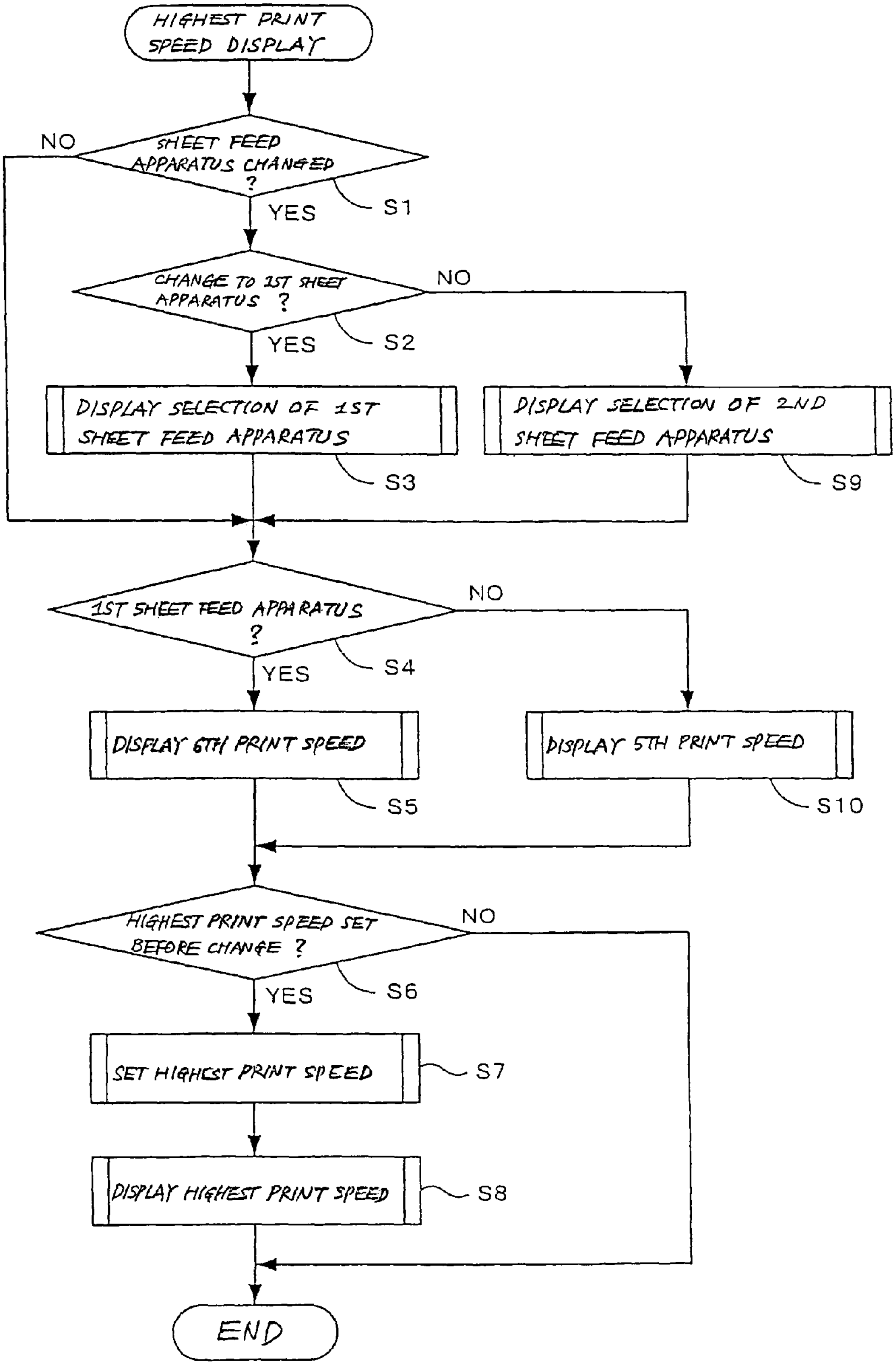
FIG. 5 is a flowchart showing a modification of the flowchart shown in FIG. 4.

More specifically, as shown in FIG. 5, the controller 33 determines whether or not the operator has changed the sheet feeding apparatus (step S1). If the answer of the step S1 is YES, the controller 33 determines whether or not the new sheet feeding apparatus is the first apparatus 14 (step S2) and displays, if the answer of the step S2 is YES, a message showing that the first apparatus 14 is selected on the display 41 (S3). Subsequently, the controller 33 again determines whether or not the sheet feeding apparatus selected is the first apparatus 14 (step S4) and displays, if the answer of the step S4 is YES, the sixth print speed on the display 41 (step S5).

After the step S5, the controller 33 determines whether or not the print speed set before the replacement of the sheet feeding apparatus was the highest speed (step S6). If the answer of the step S6 is YES, the controller 33 sets the highest sheet feed speed available with the first sheet feeding apparatus 14 (step S7) and shows the highest print speed on the display 41 (S8).

On the other hand, if the answer of the step S2 is NO, meaning that the first sheet feeding apparatus 14 is not selected, then the controller 33 displays on the display 41 a message showing that the second sheet feeding apparatus 15 is selected (step S9). Further, if the answer of the step S4 is NO, the controller 33 displays the fifth print speed on the display 41 (step S10).

As stated above, by automatically varying the highest print speed, it is possible to execute printing at the highest available speed when the sheet feeding apparatus is replaced without forcing the operator to reconfirm a print speed. It should be noted that the numbers of incremental steps and the numbers of sheets for a unit time described in the illustrative embodiment and modification thereof as print speeds are only illustrative and may be changed, as desired.

Second Embodiment

Figure 6:
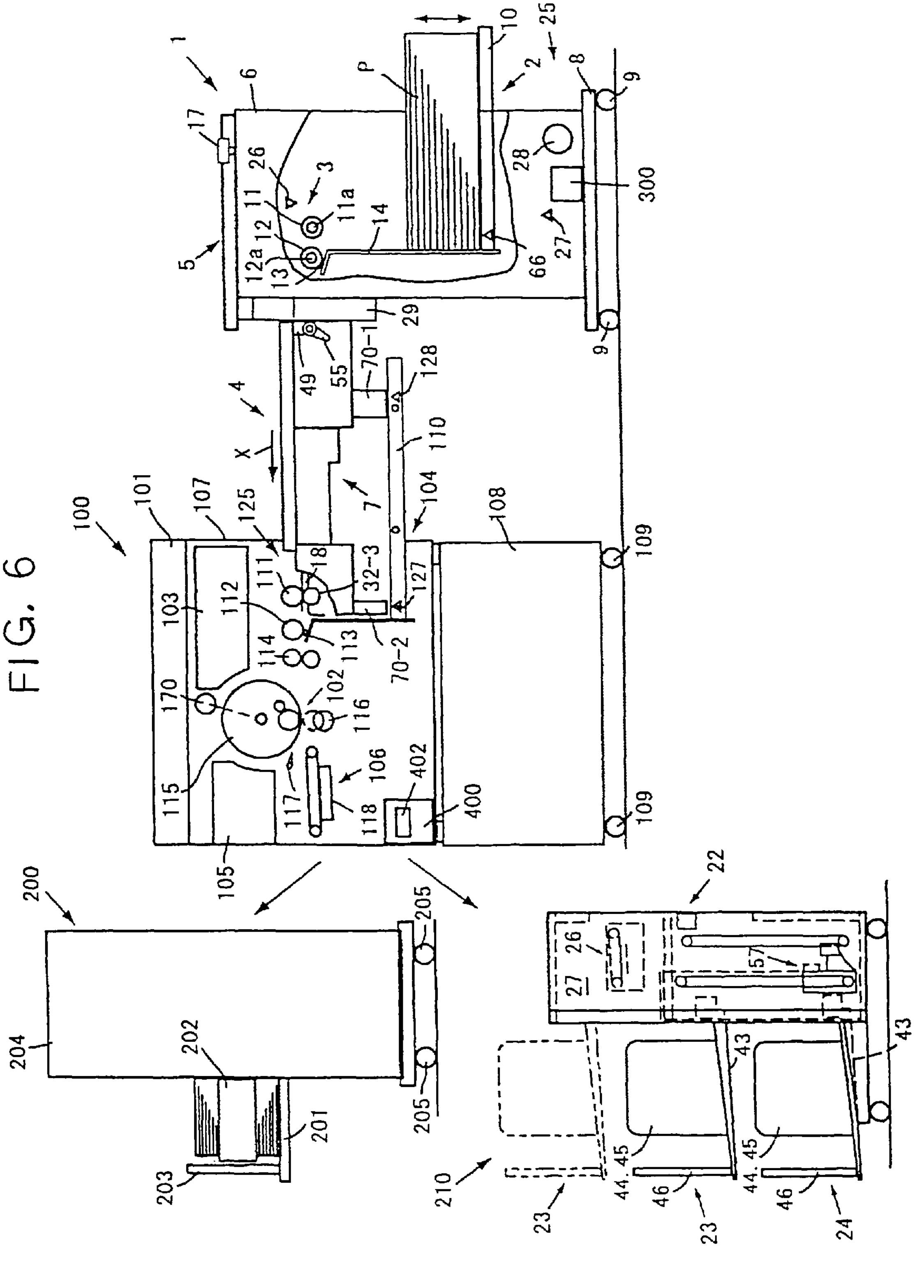
FIG. 6 is a front view showing a second embodiment of the printer in accordance with the present invention and also implemented as a stencil printer and a sheet feeding apparatus and sheet discharging apparatuses selectively connectable to the printer.
Figure 7:
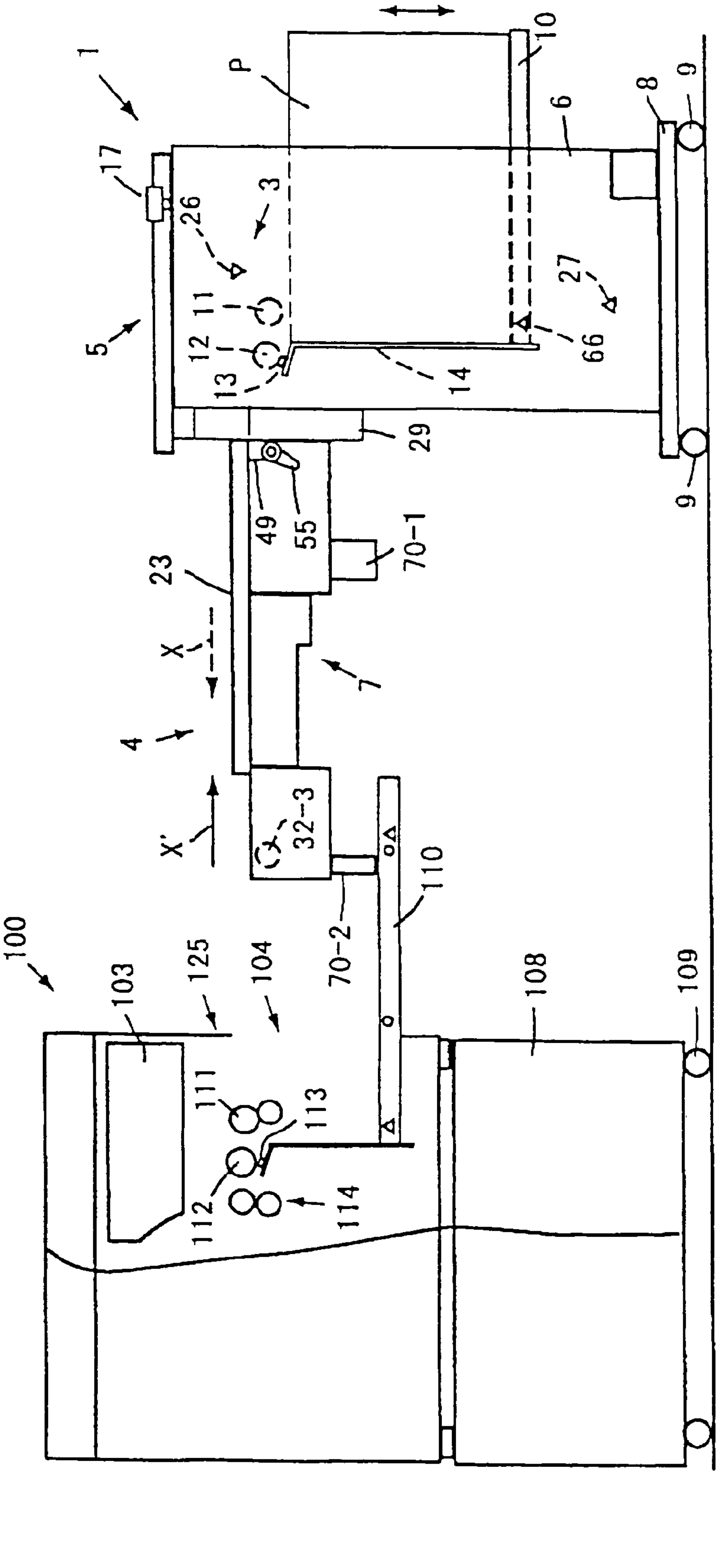
FIG. 7 is a front view showing a mass sheet feeding apparatus or sheet bank, which is a specific form of a sheet feeding apparatus, in a disconnected position.

FIGS. 6 and 7 show the general construction of a second embodiment of the printer in accordance with the present invention. As shown in FIG. 6, the second embodiment is generally made up of a mass sheet feeding apparatus 1 with an intermediate conveying unit or section 4, which is a specific form of a sheet feeder, a stencil printer or printing device 100 and a mass sheet discharging apparatus 200 connectable to the stencil printer 100. The stencil printer 100 has a conventional construction as will be described later.

The mass sheet feeding apparatus 1 is movable to a connected position shown in FIG. 6 in a direction X or to a disconnected position shown in FIG. 7 in a direction X' opposite to the direction X. In the connected position, a third roller 32-2, forming part of sheet conveying means included in the intermediate conveying unit 4, is positioned beneath and pressed against a roller 111 included in the printer 100 to thereby surely transfer a sheet or recording medium P fed from the mass sheet feeding apparatus 1 to the printer 100. On the other hand, in the disconnected position, the third roller 32-3 of the intermediate conveying unit 4 is released from the roller 111 of the printer 100. The rollers 32-3 and 111 are positioned relative to each other such that pressure, corresponding to adequate sheet conveying pressure, acts on the roller 32-3 when the mass feeding apparatus 1 is moved to the connected position.

More specifically, as shown in FIGS. 6 and 7, the mass sheet feeding apparatus 1 is movable in the direction X to the connected position at which the paper sheets P can be fed from the intermediate conveying unit 4 to the roller 111 of the printer body with the intermediate conveying unit 4 being positioned on a table 110, which is mounted on the printer body and held at a preselected height then. In the illustrative embodiment, the preselected height at the connected position refers to the lowermost position or lower limit position of the table 110, which is sensed by a lower limit sensor, not shown, mounted on a side wall of the printer body. Also, the mass sheet feeding apparatus 1 is movable in the direction X' to the disconnected position spaced from the connected position, as shown in FIG. 7.

The mass sheet feeding apparatus 1 includes a casing or frame 6 accommodating a stacking section 2 and a sheet feeding mechanism 3, which will be described specifically later. The intermediate conveying unit 4, forming part of the mass sheet feeding apparatus 1, includes a casing or frame 7. Further, the printer or printer body 100 includes a casing or frame 107. In addition, the mass print discharging apparatus 200 includes a casing or frame 204.

The stencil printer 100, the mass print discharging apparatus 200, a multi-tray sheet discharging apparatus, which will be described later, and the mass sheet feeding apparatus 1 will be sequentially described in this order in detail hereinafter for the convenience of illustration.

The stencil printer 100 includes a scanner or image reading section 101 mounted on the top of the casing 107 for reading a document image. Image data read by the scanner 107 or image data received from a personal computer or similar data input unit, not shown, are input to a master making section 103. The master making section 103 perforates, or cuts, a thermosensitive stencil paid out from a roll in accordance with the image data. A sheet feeding section or body sheet feeding section 104 conveys a paper sheet P, not shown, fed from the table 110 of the printer body or the mass sheet-feeding apparatus 1 toward a printing section 102. The printing section 102 forms an image on the paper sheet P with a print drum 115 around which the master, not shown, produced by the master making section 103 is wrapped. A sheet discharging section 106 discharges the paper sheet or print, which carries the image thereon, to the outside of the casing 107. The stencil printer 100 is mounted on an exclusive table 108 having casters 109 via the casing 107.

The sheet feeding section 104 arranged on the right-hand side of the printer body includes the table 110 mentioned earlier and configured to be elevatable with paper sheets P stacked thereon. A pickup roller 111 pays out the top paper sheet P, not shown, from the table 110 or conveys a paper sheet P fed from the mass sheet feeding apparatus 1. A separator roller 112 separates the top sheet paid out by the pickup roller 111 from the underlying paper sheets P while conveying it toward a registration roller pair 114. A pad 113 serves as a friction member that separates the top sheet P from the underlying sheets P in cooperation with the separator roller 112. The registration roller pair 114 once stops the paper sheet P fed thereto and then drives it toward the printing section or image forming section 102 at preselected timing.

The table 110 is foldable from the position shown in FIG. 6 to a position where it closes a sheet inlet 125 formed in the body casing 107. Disposed in the table 110 are a sheet sensor or sheet sensing means 127 for sensing paper sheets stacked on the table 110 and a sheet length sensor or sheet length sensing means 128 for sensing the length of sheets on the table 110. The sheet length sensor 128 constitutes sheet size sensing means for sensing the lengthwise and widthwise sizes of the paper sheets in interlocked relation to the movement of a pair of side fences, not shown, which are movable toward or away from each other on the table 110 in the widthwise direction Y of the paper sheets. The sheet sensor 127 and sheet length sensor 128 each are implemented by a reflection type photosensor including a light emitting device and a light-sensitive device, although not shown specifically.

The table 110 is controllably driven by a drive mechanism, not shown, in the up-and-down direction, as viewed in FIGS. 6 and 7, such that the top of a stack of paper sheets P set thereon remains in contact with the pickup roller 111 with preselected pressure capable of conveying a paper sheet P. The pickup roller 111 plays the role of sheet feeding means included in the body sheet feeding section 104. Also, the separator roller 112 and pad 113 constitute sheet separating means included in the body sheet feeding section 104.

Figure 10:
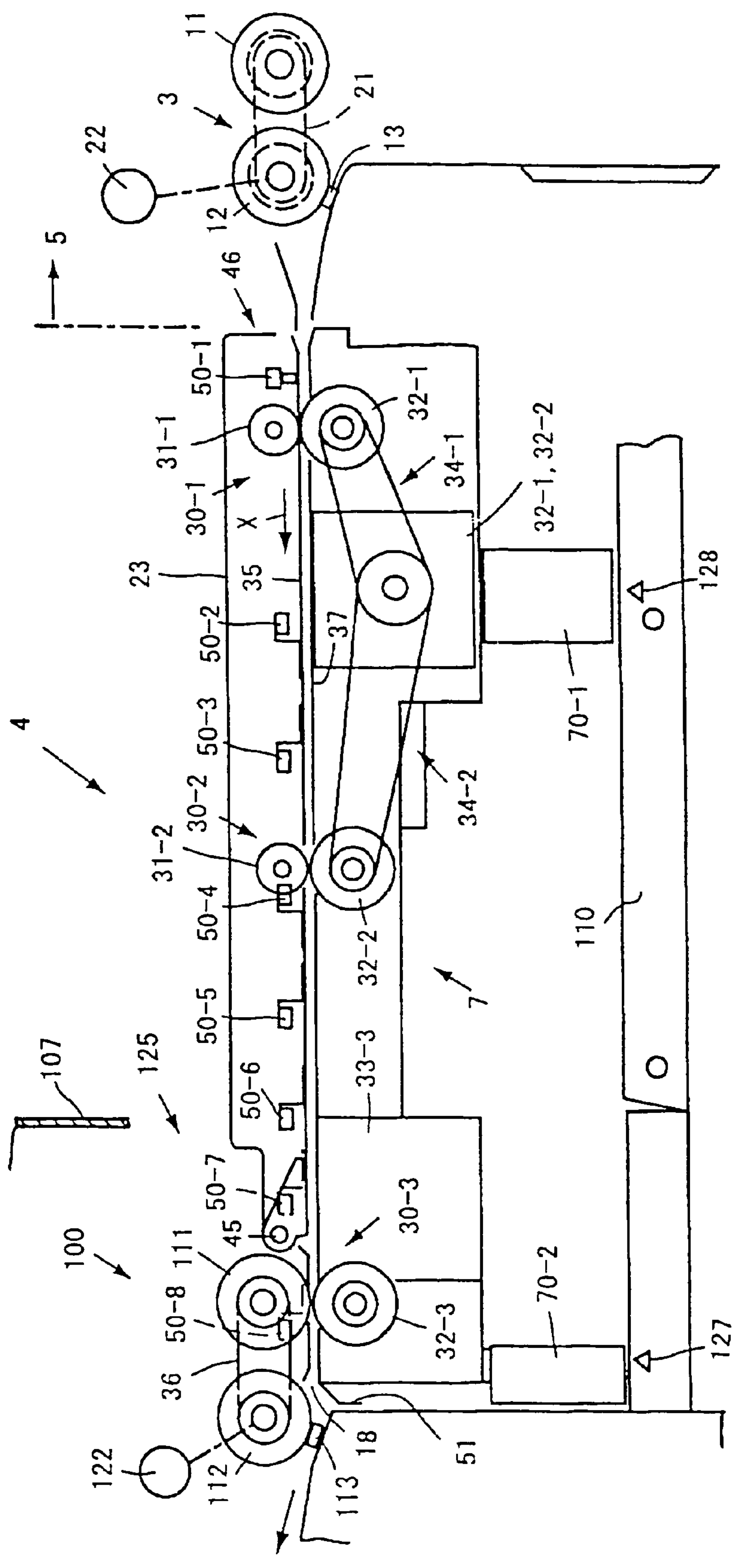
FIG. 10 is a front view showing essential arrangements around an intermediate conveying section included in the mass sheet feeding-apparatus.

More specifically, the pickup roller 111 and separator roller 112 both are rotatable only clockwise and driven by a sheet feed motor or body sheet feed drive means 122, see FIG. 10, which is implemented by a stepping motor in the illustrative embodiment. To feed a paper sheet P, the sheet feed motor 122 is driven in, e.g., the forward direction to rotate the separator roller 112 and pickup roller 111 clockwise. As a result, the top paper sheet P on the table 110 or a paper sheet fed from the mass sheet feeding apparatus 1 is driven toward the registration roller pair 114, FIG. 6.

The printing section 102 is arranged at substantially the center of the body casing 107 and includes the print drum 115 mentioned previously. Ink feeding means, not shown, is arranged inside the print drum 115. A press roller or pressing member 116 presses a paper sheet P fed from the sheet feeding section 104 or the mass sheet feeding apparatus 1 against the circumferential surface of the print drum 115, thereby transferring ink to the paper sheet P via the print drum 115. The pressing member may be implemented by a press drum on which a damper or clamping means for holding the leading edge of a paper sheet P is mounted, although not shown specifically.

In the illustrative embodiment, the print drum 115 is rotatable at any one of a master adhering speed for adhering a master to the print drum 115 and a plurality of usual print speeds for producing prints. The mater adhering speed may be sixteen sheets or thirty sheets for a minute, i.e., 16 rpm (revolutions per minute) or 30 rpm, respectively. In the illustrative embodiment, six print speeds are available, i.e., sixty sheets, seventy-five sheets, ninety sheets, a hundred and five sheets, a hundred and twenty sheets and a hundred and thirty-five sheets for a minute, i.e., 60 rpm, 75 rpm, 90 rpm, 105 rpm, 120 rpm and 135 rpm, respectively. The printer 100 is therefore operable at any one of six different speeds, i.e., a first, a second, a third, a fourth, a fifth and a sixth speed corresponding to sixty sheets, seventy-five sheets, ninety sheets, a hundred and five sheets, a hundred and twenty sheets and a hundred and thirty-five sheets for a minute, respectively. It should be noted that such a master adhering speed and print speeds are only illustrative and may be varied, as desired.

The print drum 115 is driven by a conventional print drum drive mechanism, not shown, including a main motor or drive means 170, which comprises a DC motor.

Figure 8:
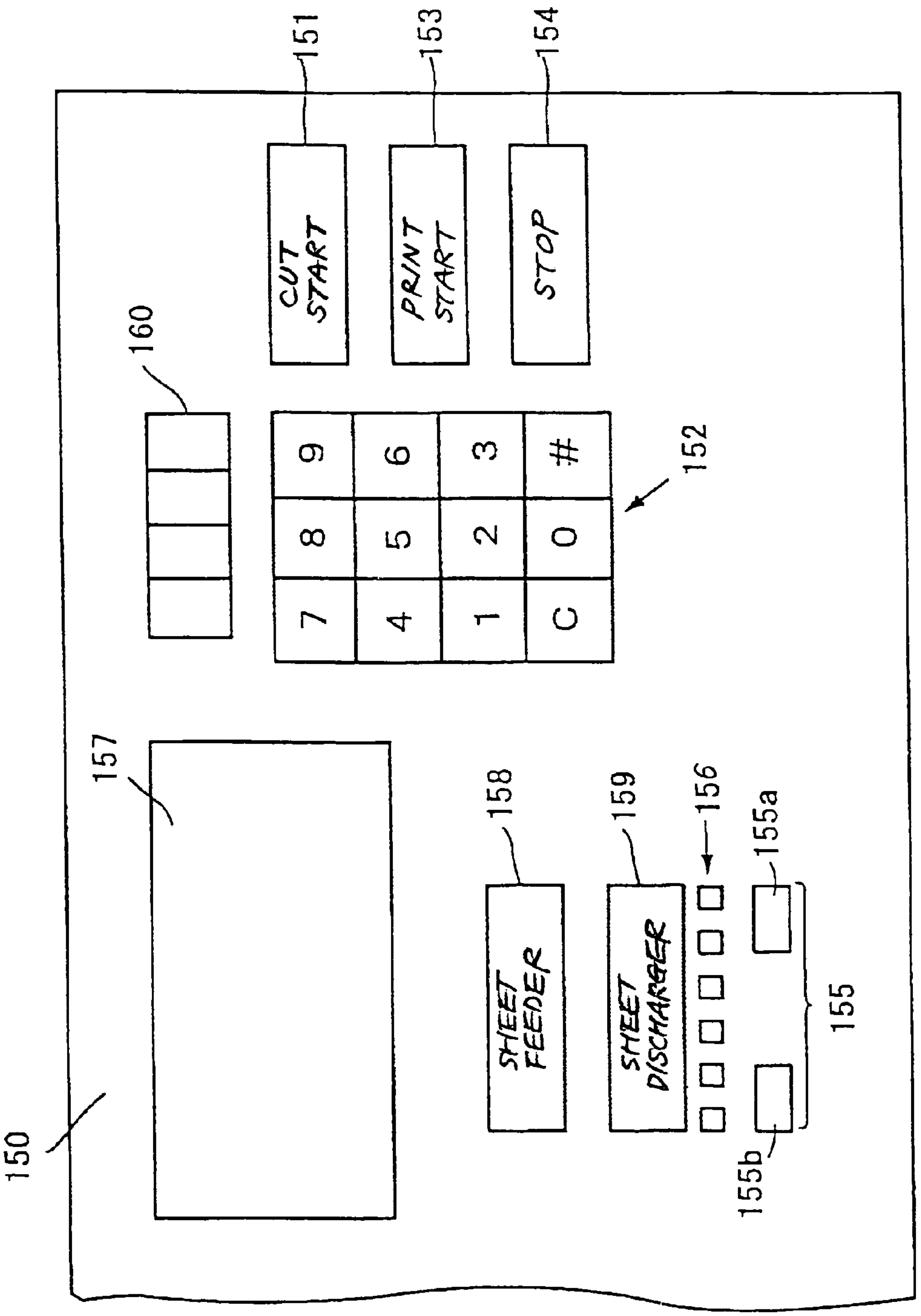
FIG. 8 is a fragmentary plan view showing a specific configuration of a control panel included in the printer.

FIG. 8 shows a specific arrangement of a control panel 150 mounted on the top of the scanner 101 for allowing the operator of the printer 100 to input desired information while displaying the conditions of the various sections of the printer 100. As shown, the control panel 150 includes a cut or perforation start key 151 for generating a start signal and ten keys 152 for inputting, e.g., the desired number of prints. The start signal mentioned above causes a document reading step to a master making step to start. A print start key 153 generates a print start signal for causing the printer 100 to repeat a printing operation a number of times corresponding to the desired number of prints input on the ten keys 152. A stop key 154 causes the printer 100 to stop performing the printing operation.

Further, in FIG. 8, print speed keys 155, i.e., a speed-down key 155*a* and a speed-up key 155*b* play the role of print speed setting means for allowing the operator to select one of the first to sixth print speeds assigned to the print drum 115. A speed indicator 156 indicates the print speed selected on the speed-down key 155*a* or the speed-up key 155*b* and is implemented by LEDs (Light Emitting Diodes). An LCD (Liquid Crystal Display) panel 157 displays various information set and sensed at consecutive stages of operation, i.e., from a document reading step to a printing step. A sheet feeder key or sheet feeder selecting means 158 allows the operator to select information relating to a sheet feeding apparatus to be connected to the printer 100. A sheet discharger key or sheet discharger selecting means 159 allows the operator to select information relating to a sheet discharging apparatus to be connected to the printer 100. In addition, an indicator 160 is capable of displaying various numerical values including the number of prints output.

It is to be noted that information relating to apparatuses connectable to the printer 100 include inputting means, not shown, to be operated by a service person at the time of, e.g., repair in addition to the selection using the sheet feeder key 158 and sheet discharger key 159.

In the illustrative embodiment, the sheet feeder key 158 and sheet discharger key 159 constitute connection identifying means each. On the other hand, the LCD 157 serves as alarm display means for displaying, when a print speed range selected out of the plurality of print speeds by the selecting means and a print speed range corresponding to a sheet feeder or a sheet discharger connected to the printer 100 do not match each other, an alarm message for urging the operator to change the print speed range. If desired, use may be made of alarm display means independent of the control panel 150 in place of the LCD 157.

Referring again to FIG. 6, the sheet discharging section 106, arranged at the left portion of the body casing 107, includes a peeler 117 and a conveyor 118. The peeler 117 peels off a paper sheet P from the periphery of the print drum 115. The conveyor 118 conveys the paper sheet P thus peeled off to either one of the mass sheet discharging apparatus 200 and multi-tray sheet discharging apparatus 118 while retaining the paper sheet P thereon by suction.

The mass sheet discharging apparatus 200 is substantially identical in configuration and operation with sheet discharging apparatus (1) disclosed in Japanese Patent Laid-Open Publication NO. 2002-226122 except that the former includes a single print tray 201 in place of a first and a second print tray (23) and (24) included in the latter. Therefore, the configuration and operation of the mass sheet discharging apparatus 200 will not be described specifically.

The print tray 201 of the mass sheet discharging apparatus 200 includes a pair of side fences 202 facing each other in the right-and-left direction of the print tray 201 and movable toward or away from each other to position opposite edges of paper sheets P sequentially stacked on the print tray 201, and an end face 203 for positioning the leading edge of each paper sheet P, as seen in the direction of conveyance. The print tray 201, like the print tray (23) or (24) mentioned above, is elevatably supported by the apparatus casing 204 via a movable body not shown. Of course, the mass sheet discharging apparatus 200, serving as a sheet discharger, may be provided with entirely the same configuration as, e.g., the sheet stacking apparatus (1) shown in FIGS. 1 through 8 of Laid-Open Publication No. 2002-226122. In the illustrative embodiment, the configuration of the sheet discharging apparatus (1) is applied to the multi-tray sheet discharging apparatus 210, which is a sheet discharger connectable to the printer 100.

The mass sheet discharging apparatus 200 is provided with casters 205 on the bottom of the casing 204 and movable between a connected position where it is connected to a sheet outlet, not shown, formed in the sheet discharging section 106 of the printer 100 and a disconnected position where the former is released from the latter.

Figure 11:
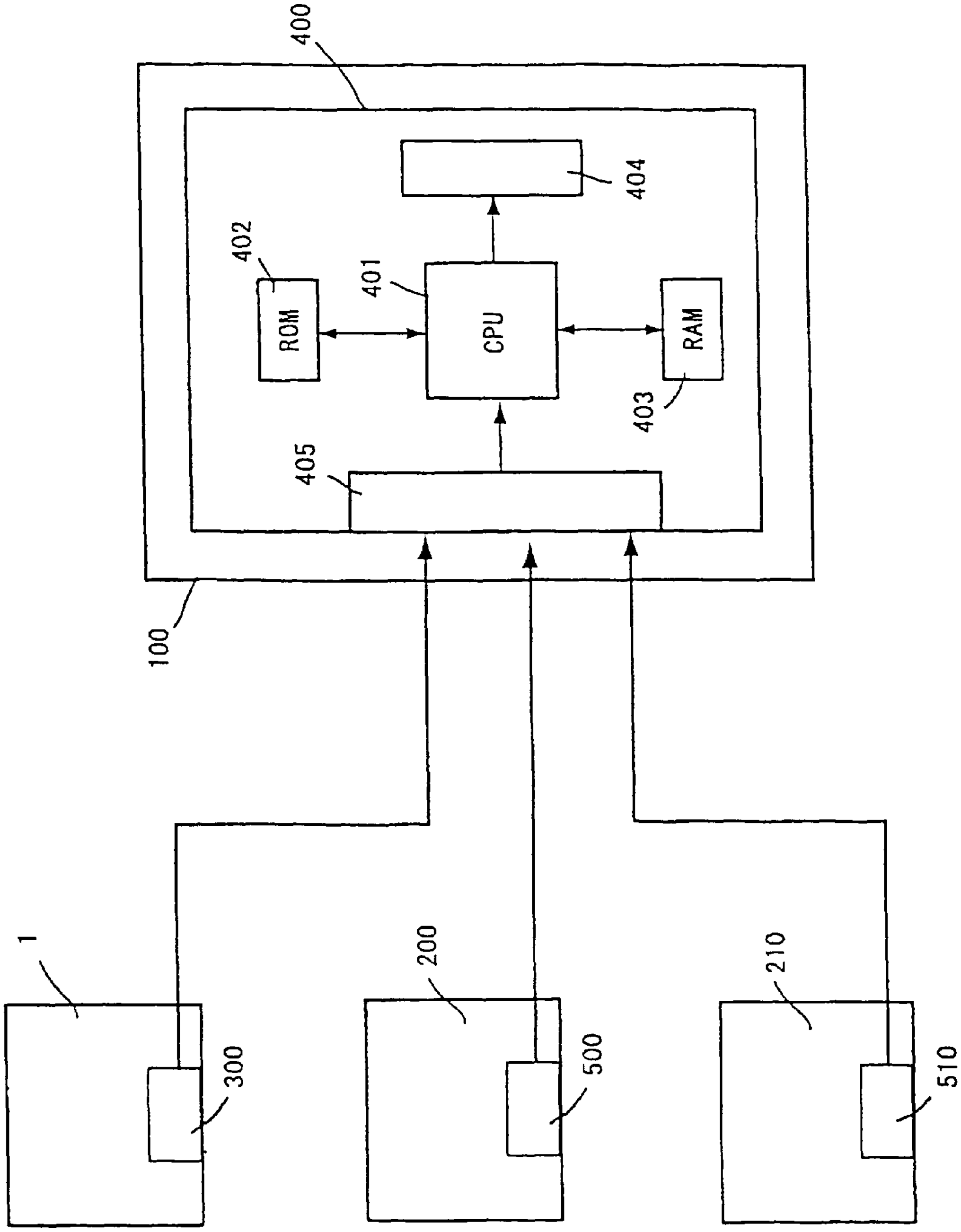
FIG. 11 is a schematic block diagram showing a controller or control means included in the printer and controllers included in the apparatuses connectable to the printer.

In the illustrative embodiment, the mass sheet discharging apparatus 200 includes an intermediate conveying member (26), a reversible motor (49) for moving the print tray 201 up and down, a drive motor, not shown, for driving the intermediate conveying member (26), and a controller or sheet discharge control means 500, see FIG. 11, for controlling the drive motor and reversible motor (49). The intermediate conveying member (26) receives a paper sheet P from the conveyor 118 and conveys it to the print tray 201. The controller 500 is implemented by a conventional computer. A memory, included in the sheet discharge control means 500, stores rotation speeds of a drive motor, not shown, for driving the intermediate conveying member (26) and representative of sheet feed speed information corresponding to the first to fifth speeds of the printer 100 and ID (identification) information particular to the mass sheet discharging apparatus 200. When the mass sheet discharging apparatus 200 is connected to the printer 100, the former is capable of changing its sheet conveying speed in accordance with the print speed set on the printer 100 while sending the ID information to the printer 100.

The range over which the sheet conveying speed of the mass sheet discharging apparatus 200 is variable corresponds to the range of the first to fifth speeds of the printer 100. Stated another way, the mass sheet discharging apparatus 200 is an apparatus in which a jam is apt to occur when paper sheets P are delivered from the printer 100 at the sixth or highest print speed.

In the illustrative embodiment, the multi-tray sheet discharging apparatus 210 includes sheet discharge control means 510, see FIG. 11, implemented by a conventional computer. A memory, included in the sheet discharge control means 510, stores rotation speeds of a drive motor, not shown, for driving the intermediate conveying member 26 and representative of sheet feed speed information corresponding to the first to fourth speeds of the printer 100 and ID information particular to the multi-tray sheet discharging apparatus 210. When the multi-tray sheet discharging apparatus 210 is connected to the printer 100, the former is capable of changing its sheet conveying speed in accordance with the print speed set on the printer 100 while sending the ID information to the printer 100. The range over which the sheet conveying speed of the multi-tray sheet discharging apparatus 210 is variable corresponds to the range of the first to fourth speeds of the printer 100. Stated another way, the multi-tray sheet discharging apparatus 210 is an apparatus in which a jam is apt to occur when paper sheets P are delivered from the printer 100 at the sixth or highest print speed.

The mass sheet discharging apparatus 200 and multi-tray sheet discharging apparatus 210 may have their sheet conveying speeds fixed without regard to the print speed set on the printer 100, if desired.

The mass sheet feeding apparatus 1 includes an apparatus body or mass sheet feeding device 5 in addition to the intermediate conveying unit 4 stated earlier. The apparatus boy 5 includes a stacking section 2 capable of being loaded with a great amount of paper sheets P and a sheet feeding mechanism 3 configured to feed the paper sheets P from the stacking section 2 one by one as well as the casing 6. The intermediate conveying unit 4 conveys a single paper sheet P fed from the sheet feeding mechanism 3 toward the sheet inlet 125 which the pickup roller 111 of the printer 100 faces. The apparatus body 5 is fixedly mounted on a carriage 8 positioned beneath the casing 6 and provided with casters 9.

The stacking section 2, sheet feeding mechanism 3 and intermediate conveying unit 4 will be described more specifically hereinafter. To simplify the description of the arrangements of various members, let the front side and rear side as seen in the direction perpendicular to the direction X be sometimes referred to as a left side or operating side and a right side or non-operating side, respectively. For the same purpose, the downstream side and upstream side in the direction X will sometimes be referred to as a front side and a rear side, respectively. As shown in FIG. 6, a pair of auxiliary side plates 29 (only one is visible) protrude from the right and left sides of the casing 6.

The stacking section 2 includes a tray 10 elevatable with a great amount of paper sheets P stacked thereon. A right and a left side fence or width regulating member 15 and 16, see FIG. 9, cooperate to regulate the width, i.e., the right and left edges of the paper sheets P. An elevating mechanism or tray elevating means 25 causes the tray 10 to selectively move upward or downward. An adequate height sensor 26 is responsive to an upper limit position assigned to the tray 10 or a sheet feed position assigned to a pickup roller 11. In this sense, the adequate height sensor 26 plays the role of upper limit sensing means or sheet feed position sensing means. A lower limit sensor or lower limit sensing means 27 is responsive to a lower limit position also assigned to the tray 10.

The adequate height sensor 26 and lower limit sensor 27, comprising a transmission type sensor each, are positioned at a preselected respective position in the casing 6 each.

The tray 10 is movable up and down with at least 3,000 plain paper sheets P of, e.g., size A3 and formed with four slots 10*a* that allow the side fences 15 and 16 to move in the direction Y, i.e., the widthwise direction of paper sheets P. A sheet sensor or sheet sensing means 66, implemented as a reflection type sensor, is disposed in the tray 10 so as to determine whether or not paper sheets P are present. It should be noted that in the illustrative embodiment a sheet size refers to a length in the sheet conveying direction X.

Figure 9:
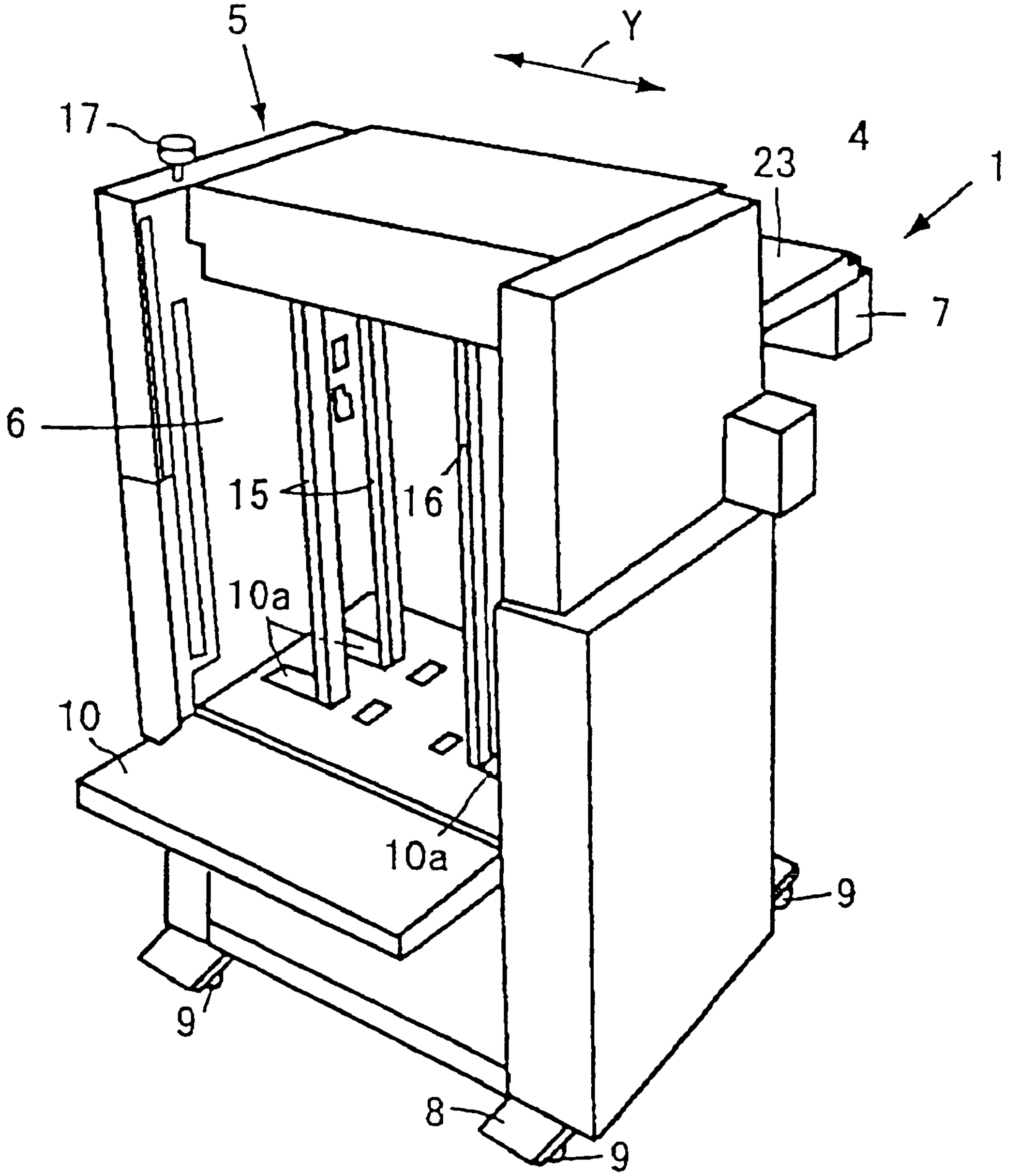
FIG. 9 is a perspective view showing the back of the mass sheet feeding apparatus.

As shown in FIG. 9 specifically, two side fences 15 are positioned in the direction X while other two side fences 16 (only one is visible) are positioned in the direction Y, and each is provided with a hollow rectangular cross-section. When a handle 17 is turned by hand, the side fences 15 and 16 are moved toward or away from each other in the direction Y via two sets of side fence positioning mechanisms mounted on the top and bottom of the casing 6.

The tray elevating mechanism 25 is so configured as to move the tray 10 upward or downward with a reversible motor or elevation drive mechanism 28 while maintaining the tray 10 in a substantially horizontal position. A controller, which will be described later, holds the tray 10 in the sheet feed position where the top of the sheet stack loaded thereon remains in contact with the pickup roller 11 with preselected conveying pressure via the tray elevating mechanism 25.

As shown in FIG. 10 also, the sheet feeding mechanism 3 includes a separator roller 12, a pickup roller 11 and a sheet feed motor or sheet feed drive means 22 for rotating the two rollers 12 and 11. The sheet feed motor 22 is implemented by a stepping motor.

The mass sheet feeding apparatus 5 may be replaced with any other suitable sheet feeding apparatus, e.g., a sheet feeding apparatus (100) disclosed in Japanese Patent Laid-Open Publication No. 8-259008 or 8-259009, if desired. More specifically, use may be made of a mass sheet feeding apparatus including an elevatable LCT (Large Capacity Table) and including sheet feeding means and sheet separating means.

As shown in FIG. 10, the intermediate conveying unit 4 includes an intermediate conveying section 18 configured to convey a paper sheet P fed from the sheet feeding mechanism 3 to the sheet inlet 125 of the printer 100. The intermediate conveying section 18 is removably supported by the auxiliary side plate pair 29 of the casing 6. The intermediate conveying unit 4 includes first, second and third sheet conveying means 30-1, 30-2 and 30-3, respectively, for conveying a paper sheet P paid out by the sheet feeding mechanism 3. A first, a second and a third motor or sheet conveyance motor 33-1, 33-2 and 33-3, respectively, drive the first, second and third sheet conveying means 33-1, 33-2 and 33-3, respectively, independently of each other. A first, a second and a third drive transferring means 34-1, 34-2 and 34-3 respectively transfer the rotation of the first, second and third motors 33-1, 33-2 and 33-3 to the first, second and third sheet conveying means 30-1, 30-2 and 30-3.

Further, in the intermediate conveying unit 4, an upper and a lower guide member 35 and 37, respectively, constitute a pair of guide means for guiding the paper sheet P being conveyed by the first to third sheet conveying means 30-1 through 30-3 to the vicinity of the sheet inlet 125 formed in the printer 100. The first to third sheet conveying means 30-1 through 30-3 and upper and lower guide members 35 and 37 are accommodated in a casing 7. A plurality of sensors or sheet sensing means for sensing at least one of the leading and trailing edges of the paper sheet P, as seen in the direction of sheet conveyance, are arranged on the upper guide member 35 at preselected intervals from the upstream side toward the downstream side of an intermediate sheet path 18. In the illustrative embodiment, a first to an eighth sensor 50-1 through 50-8 are mounted on the upper guide member 35, and each senses both of the leading and trailing edges of the paper sheet P. Also, a plurality of sheet width sensing means, not shown, are positioned at preselected intervals in the direction Y perpendicular to the intermediate sheet path 18 for sensing the width of the paper sheet P.

The first sheet conveying means 30-1 is made up of a first conveying roller 32-1 and a first pressing roller 31-1 pressed against the roller 32-1. Likewise, the second sheet conveying means 30-2 is made up of a second conveying roller 32-2 and a second pressing roller 31-2 pressed against the roller 32-2. The third sheet conveying means 30-3 comprises a third conveying roller 32-3. The first to third sheet conveying means 30-1 through 30-3 are sequentially arranged in this order from the upstream side toward the downstream side at preselected intervals.

The first pressing roller 31-1 has at least its outer peripheral portion, including the circumferential surface, formed of resin. On the other hand, the first conveying roller 32-1 has at least its outer peripheral portion, including the circumferential surface, formed of suitable rubber or similar high-friction elastic material having a high coefficient of friction relative to the paper sheets P stacked in the mass sheet-feeding apparatus 1. The second pressing roller 31-2, second conveying roller 32-2 and third conveying roller 32-3 are identical in structure with the first pressing roller 32-1 and first conveying roller 32-1.

Because the first and second sheet conveying means 30-1 and 30-2 are identical with each other except for the position, let the following description concentrate on only one of them except for the position thereof. In the following description, numerals that follow hyphens are representative of the order of arrangement from the upstream side toward the downstream side of the intermediate sheet path 18, and the prefixes “first” to “third” will sometimes be omitted for simplicity.

Likewise, because the first and second motors 33-1 and 33-2 are identical with each other except for the position, the following description will concentrate on only one of them except for the position thereof. Further, because the first to eighth sensors 50-1 through 50-8 are identical with each other except for the position, the following description will concentrate on only one of them, e.g., the first sensor 50-1 except for the position thereof. In the following description, numerals that follow hyphens are representative of the order of arrangement from the upstream side toward the downstream side of the intermediate sheet path 18, and the prefixes “first” to “eighth” will sometimes be omitted for simplicity.

As shown in FIG. 10, the pair of guide means are implemented as the upper guide plate or upper guide member 35, an auxiliary upper guide plate 36, and the lower guide plate or lower guide member 37 facing the upper guide plate 35. The space surrounded by the upper guide plate 35, auxiliary upper guide plate 36 and lower guide plate 37 is the intermediate sheet path 18.

An upper guide unit 46 is angularly movable about a shaft 45 by a preselected angle such that its free end is movable away from the lower guide plate 37.

The first to seventh sensors 50-2 through 50-7 are fastened to the upper guide plate 35 by screws or similar fastening means not shown. The first to eighth sensors 50-1 through 50-8 each are implemented by a reflection type sensor. The eighth sensor 50-8 is fastened to the auxiliary upper guide plate 36 by screws or similar fastening means not shown.

The lower guide plate 37 is fastened to the upper portion of the casing 7, which has a top-open box configuration, by screws or similar fastening means. An inclined member 51 is affixed to the front end of the lower guide plate 37 and inclined downward, as viewed in FIG. 10. When the mass sheet feeding apparatus 1 is moved in the direction X to the connected position shown in FIG. 6, the inclined member 51 is smoothly brought into contact with the roller 111 of the printer 100 and a roller mounted on the bottom of a sheet feed feeler, not shown, so that a sheet feed arm, not shown, is angularly moved to cause the sheet feed feeler to contact the adequate height sensor 126.

The first to third motors 33-1 through 33-3 are affixed to the casing 7 via respective motor brackets, not shown, and implemented by variable-speed stepping motors. The first and second conveying rollers 32-1 and 32-2 each are positioned such that part of the periphery protrudes upward into the sheet path 18 via an opening formed in the lower guide plate 37.

The third roller 32-3 is positioned at the most downstream side of the sheet path 18 and comprises a single roller. The third roller 32-3 is mounted at the preselected position of the intermediate sheet conveying unit 4 such that when the mass sheet feeding apparatus 1 is brought to the connected position shown in FIG. 6, the roller 32-3 gets under and presses the roller 111 of the printer 100.

A shutter mechanism 70-1 is positioned in the lower portion of the casing 7 and faces or blocks, when the mass sheet feeding apparatus 1 is moved to the connected position shown in FIG. 6, the sheet length sensor 128 disposed in the table 110. In this sense, the shutter mechanism 70-1 plays the role of a shutter mechanism for sensing the length of a paper sheet P. Likewise, when the mass sheet feeding apparatus is in the connected position, a shutter mechanism 70-2 faces or blocks the sheet sensor 127 and, in this sense, functions to determine whether or not a paper sheet P is present.

More specifically, when the mass sheet feeding apparatus 1 is brought to the connected position shown in FIG. 6, a shutter, not shown, included in the shutter mechanism 70-2 takes a dummy sheet-present position for intercepting and reflecting light issuing from the sheet sensor 127. Subsequently, when the stacking section 2 and intermediate conveying unit 4 run out of paper sheets P, the above shutter takes a dummy sheet-absence position, allowing the controller of the printer 100 to see the absence of paper sheets P. On the other hand, if a paper sheet P is present in the intermediate conveying unit 4, the shutter takes the dummy sheet-present position and allows the printer 100 to determine that a paper sheet P is present, establishing the sheet path from the intermediate conveying unit 4 to the printer.

The mass sheet feeding apparatus 1 includes a controller or sheet feed control means 300, see FIG. 11, implemented as a conventional computer and configured to control the drive of the motors 22, 28 and 33-1 through 33-3 mounted on the apparatus 1. Particularly, in the illustrative embodiment, the controller 300 is capable of varying a sheet feed speed by varying the rotation speeds of the sheet feed motor 22 and first to third motors, 33-1 through 33-3. The variable sheet feed speed range coincides with the range of the first to fifth print speeds available with the printer 100. The mass sheet feeding apparatus 1 is therefore apt to cause a sheet jam to occur when the printer 100 is operated at the sixth or highest print speed, because the apparatus 1 cannot adapt itself to the sixth print speed. A memory or storing means, not shown, is included in the controller 300 and stores beforehand sheet feed speed information corresponding to the first to fifth print speeds of the printer 100 and ID information particular to the mass sheet feeding apparatus 1. When the mass sheet feeding apparatus 1 is connected to the printer 100, the apparatus 1 selects a sheet feed speed matching a print speed set on the printer 100 and sends an ID signal to the printer 100.

Specific control routines unique to the illustrative embodiment will be described hereinafter.

<First Routine>

To begin with, a control system included in the stencil printer 100 will be described hereinafter. As shown in FIG. 11, the printer 100 includes control means 400 including a CPU 401, a ROM 402, a RAM 403 and an interface not shown. The ROM 402 stores beforehand print speed information representative of the first to sixth print speeds, print speed range information representative of print speeds adaptive to the individual apparatuses connectable to the printer 100, and information relating to such connectable apparatuses. The print speed range information mentioned above refers to the first print speed of the printer 100 to a preselected upper limit speed. More specifically, the print speed range is between the lowest print speed to which an apparatus connected to the printer 100 is adaptive and the highest print speed of the printer 100. Such a print speed range is stored in the ROM 402 in correspondence to each sheet feeding apparatus and each sheet discharging apparatus connectable to the printer 100.

When a sheet feeding apparatus or a sheet discharging apparatus is connected to the printer 100, the controller 400 suitably reads print speed range information corresponding to the apparatus out of the ROM 402 and then selects a print speed range in accordance with the print speed range information read out. In the first control routine, print speed range information relating to each of the mass sheet feeding apparatus 1, mass sheet discharging apparatus 200 and multi-tray sheet discharging apparatus 210 are stored in the ROM 402.

The control panel 150 is connected to the controller 400 via an interface, not shown, so as to be communicable with the controller 400. The controller 400 includes a motor control circuit 404 and a connection identification circuit 406 in addition to the CPU 401, ROM 402 and RAM 403. The motor control circuit 404 controls the speed of each motor included in the printer 100 in accordance with the print speed selected on the print speed key 155 of the control panel 150 by the operator. The connection identification circuit 405 determines whether or not a sheet feeding apparatus or a sheet discharging apparatus is connected to the printer 100 and identifies, if such an apparatus is connected to the printer 100, the type of the apparatus.

Figure 12:
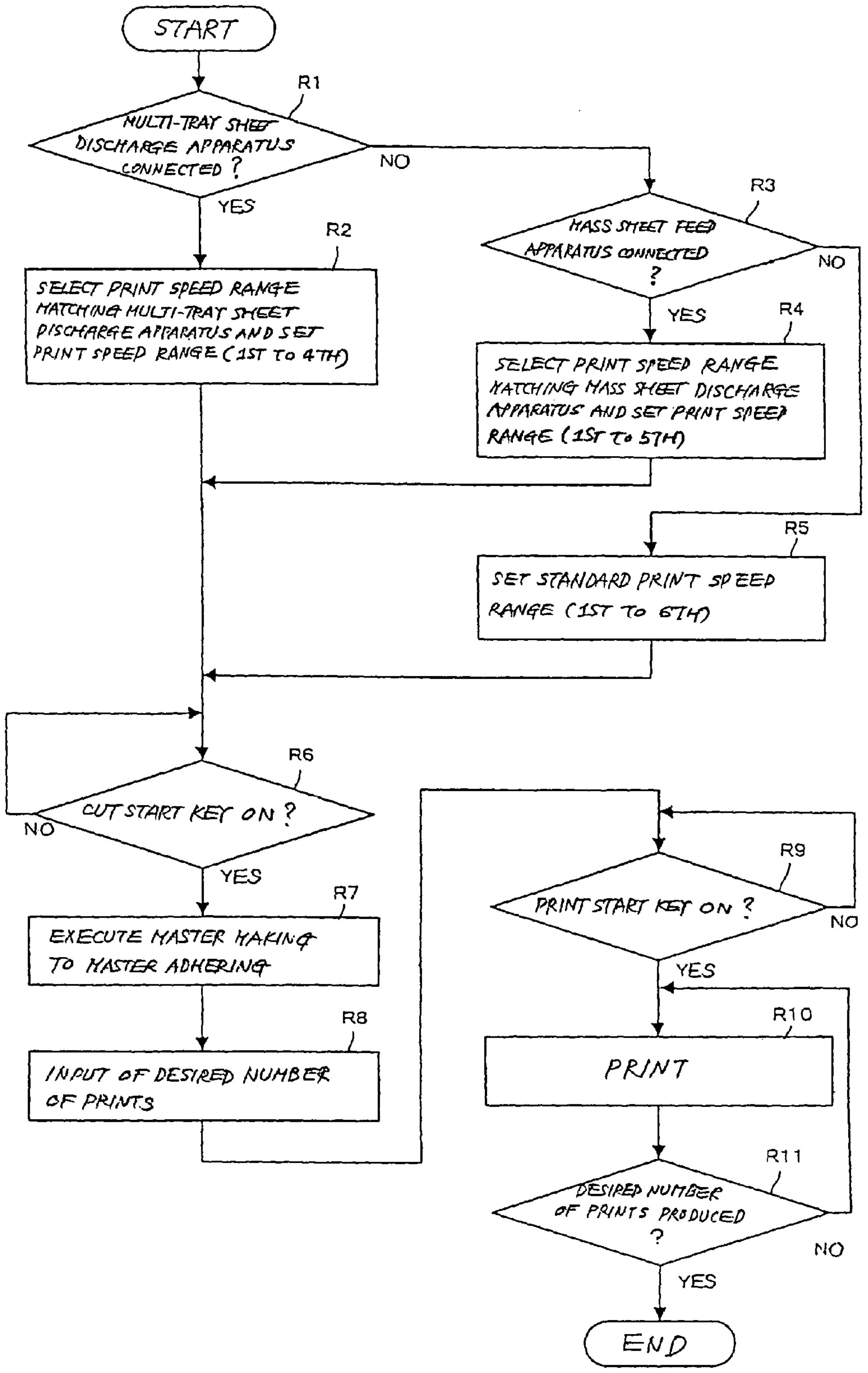
FIGS. 12 through 19 are flowcharts demonstrating a first to an eighth specific control routine, respectively, available with the second embodiment.

Reference will be made to FIG. 12 for describing a specific control routine to be executed by the printer 100. The procedure shown in FIG. 12 relates to the identification of a sheet discharging apparatus and variable control over the print speed range matching the apparatus thus identified. In this example, assume that the mass sheet discharging apparatus 200 and multi-stage sheet discharging apparatus 210 both are switched on beforehand as well as the printer 100.

As shown in FIG. 12, the connection identification circuit 405 determines whether or not the multi-tray sheet discharging apparatus 210 is connected to the printer 100 (step R1). More specifically, if the multi-tray sheet discharging apparatus 210 is connected to the printer 100, the controller 510 of the sheet discharging apparatus 210 sends an ID signal to the printer 100, so that the connection identification circuit 405 makes the above decision on the basis of the ID signal. If the answer of the step R1 is positive (Y), meaning that the multi-tray sheet discharging apparatus 210 is connected to the printer 100, the CPU 401 reads the print speed range information corresponding to the apparatus 210 out of the ROM 402 and then sets the print speed range of the printer 100 in accordance with the above information (step R2). More specifically, the CPU 401 writes the range of from the first speed to the fourth speed in the RAM 403 as the print speed range.

If the answer of the step R1 is negative (N), then the connection identification circuit 405 determines whether or not the mass sheet discharging apparatus 200 is connected to the printer 100 (step R3). More specifically, if the mass sheet discharging apparatus is connected to the printer 100, the controller 500 of the apparatus 200 sends an ID signal to the printer 100, so that the connection identification circuit 405 references the ID signal to see if the apparatus 200 is connected to the printer 100. If the answer of the step R3 is Y, the CPU 401 reads the print speed range information corresponding to the mass sheet feeding apparatus 200 out of the ROM 402 and then sets the print speed range of the printer 100 in accordance with the above information (R4). More specifically, the CPU 401 writes the range of from the first speed to the fifth speed in the RAM 403.

If the answer of the step R3 is N, meaning that the mass sheet discharging apparatus 200 is not connected to the printer 100, then the connection identification circuit 405 determines that neither the multi-tray sheet discharging apparatus 210 nor the mass sheet discharging apparatus 210 is connected to the printer 100. In this case, the CPU 401 writes the range of the first speed to the sixth or highest speed, which is the standard print speed range, in the RAM 403.

After the print speed range has been set in any one of the steps R2, R4 and R5, the controller 400 determines whether or not the cut start key 151 is in an ON state (step R6). When the cut start key 151 is turned on (Y, step R6), the control means 400 executes a procedure beginning with a master making step and ending with a trial printing step and then causes the printer 100 to stop operating (step R7). Subsequently, when a desired number of prints is input on the ten keys 152 (step R8) and then the print start key 153 is turned on (R9), the controller 400 executes printing at the print speed set in the step R2, R4 or 5 (step R10). As a result, paper sheets or prints P, each carrying an image thereon, are sequentially driven out of the printer 100 to the sheet discharging apparatus connected thereto.

More specifically, the controller 400 continuously counts the prints output from the printer 100 with a counter, not shown, and repeats the printing operation until the count of the counter reaches the desired number of prints set on the ten keys 152 (R11). When the count of the counter coincides with the desired number of prints (Y, step R11), the controller 400 determines that printing has ended and then ends the procedure of FIG. 12.

As stated above, when the mass sheet discharging apparatus 200, multi-tray sheet discharging apparatus 210 or similar sheet discharging apparatus having a respective allowable print speed range is connected to the printer 100, the controller 400 reads print speed range information matching the sheet discharging apparatus out of the ROM 402 and then automatically sets a particular print speed range on the body casing 107, i.e., the printer 100 in accordance with the above information. Consequently, a print speed range, matching a sheet discharging apparatus connected to the printer 100, is automatically set to insure stable sheet discharge for thereby noticeably reducing sheet jams. Moreover, the operator does not have to input a print speed range in accordance with the sheet discharging apparatus connected to the printer 100 and can therefore easily, efficiently operate the printer 100.

<Second Routine>

Figure 13:
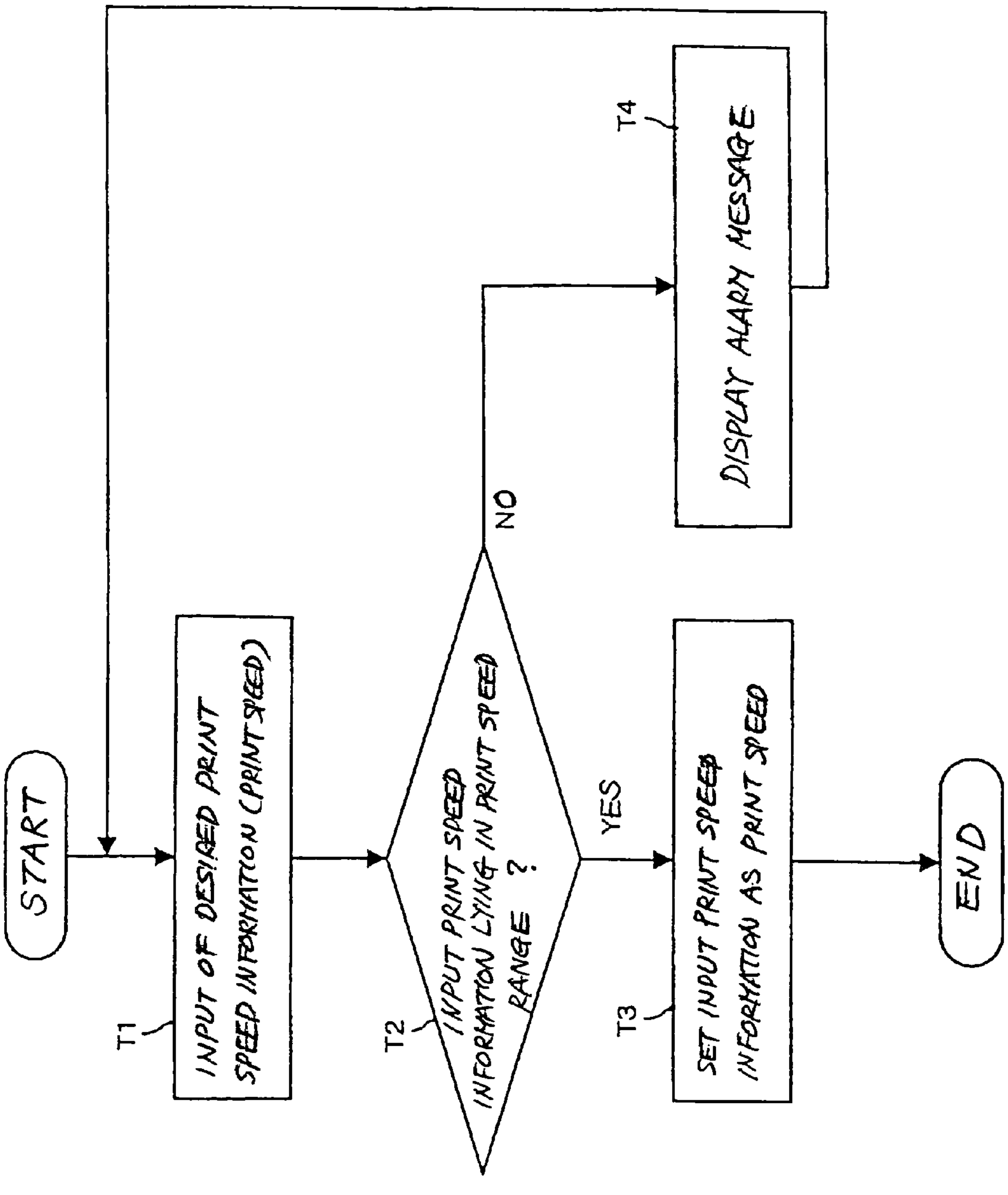

FIG. 13 demonstrates a second specific control routine that warns the operator of the printer against the mismatch of print speed and sheet feed speed. The second control routine is stored in the ROM 402 of the control means 400 and executed after a print speed range, corresponding to an apparatus connected to the printer 100, has been set. For example, the second routine may preferably be executed before or after the step R6 of FIG. 12. Assume that the mass sheet discharging apparatus 200 is connected to the printer 100. Then, the print speed range corresponding to the apparatus 200 and ranging from the first speed to the fifth speed is automatically set on the printer 100.

As shown in FIG. 13, the operator of the printer 100 inputs print speed information representative of a desired print speed, e.g., the fourth speed on the print speed key 155 (step T1). Then, the controller 400 determines whether or not the print speed information lies in the print speed range set on the printer 100 beforehand (step T2). If the answer of the step T2 is Y, meaning that the print speed information input by the operator lies in the above range (Y, step T2), the controller 400 writes the print speed selected by the operator in the RAM 403 as a print speed assigned to the printer 100 (step T3).

If the answer of the step T2 is N, e.g., if the print speed input by the operator is the sixth print speed, then the controller 400 does not write the sixth print speed in the RAM 403 because the fifth speed is the highest print speed set on the printer 100. In this case, the controller 400 displays on the LCD panel 157 a message warning that the print speed input by the operator does not match the mass sheet discharging apparatus 200 and urging the operator to change the print speed range (step T4), and then returns to the step T1. Such a procedure is repeated until the operator inputs print speed information matching the mass sheet discharging apparatus 200 on the print speed key 155 of the control panel 150.

As stated above, the second routine allows the operator to input a desire print speed on the print speed key 155, but displays, if the desired print speed does not match an apparatus connected to the printer 100, an alarm message on the LCD panel 157. This allows the operator to easily see that a print speed input on the print speed key 155 does not match an apparatus connected to the printer 100, thereby promoting easy, efficient operation.

<Third Routine>

Figure 14:
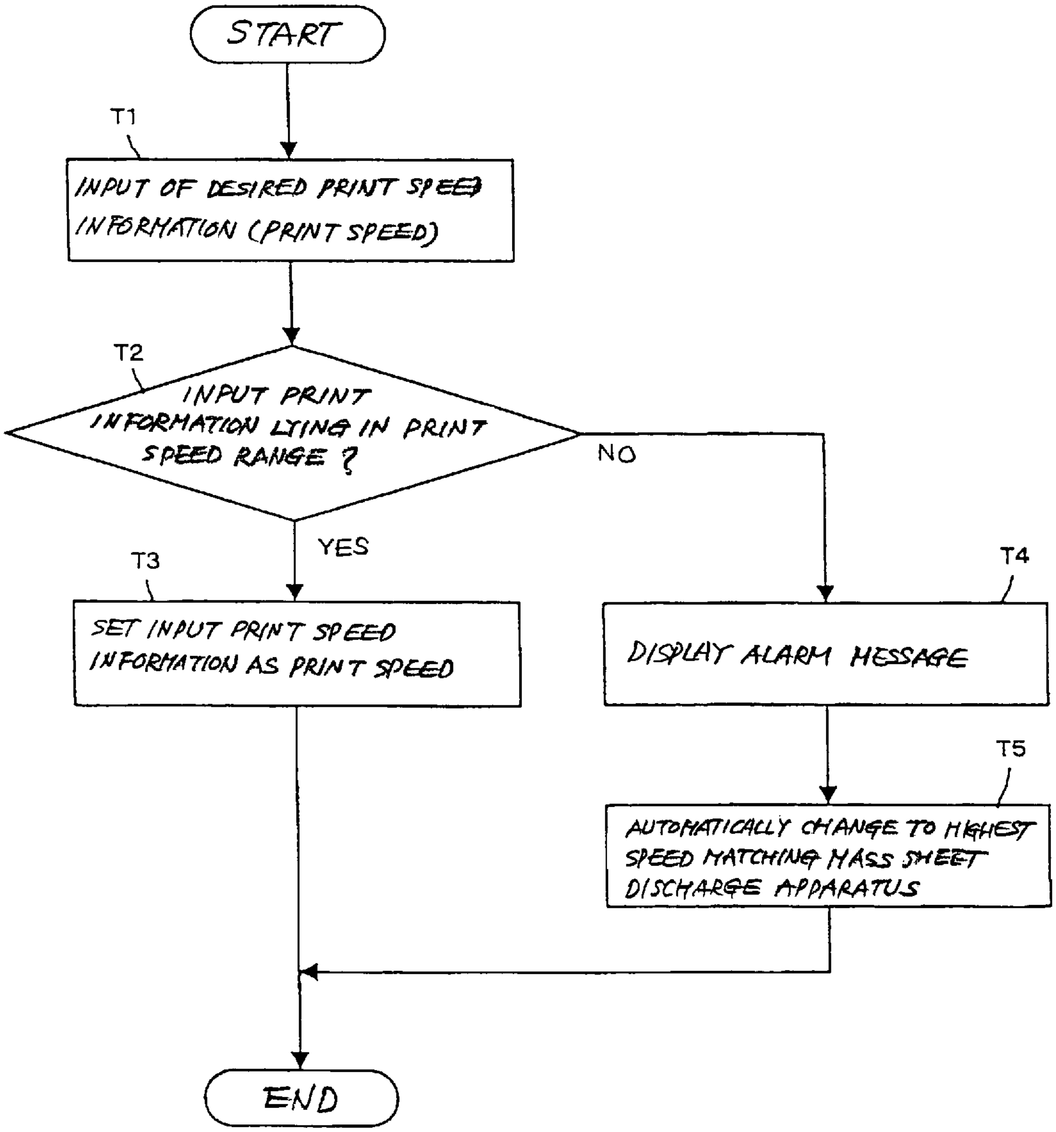

FIG. 14 shows a third specific routine which is a modification of the second routine described above. In the second routine shown in FIG. 13, the controller 400 displays the alarm message in the step T4 and then returns to the step T1 for urging the operator to change the print speed input on the print speed key 155. By contrast, in the third routine shown in FIG. 14, if the print speed input in the step T1 is the sixth or highest print speed, the controller 400, determining that the operator desires the highest print speed, executes a step T5 after displaying the alarm message in the step T4. In the step T5, the controller 400 automatically sets the fifth print speed which is the highest speed matching the mass sheet discharging apparatus 200.

As stated above, the third routine implements the operator's intension, i.e., printing at the highest speed as a highest speed matching an apparatus connected to the printer 100. This makes it unnecessary for the operator to change the print speed input on the print speed key 155 for thereby further promoting easy, efficient operation.

<Fourth Routine>

Figure 15:
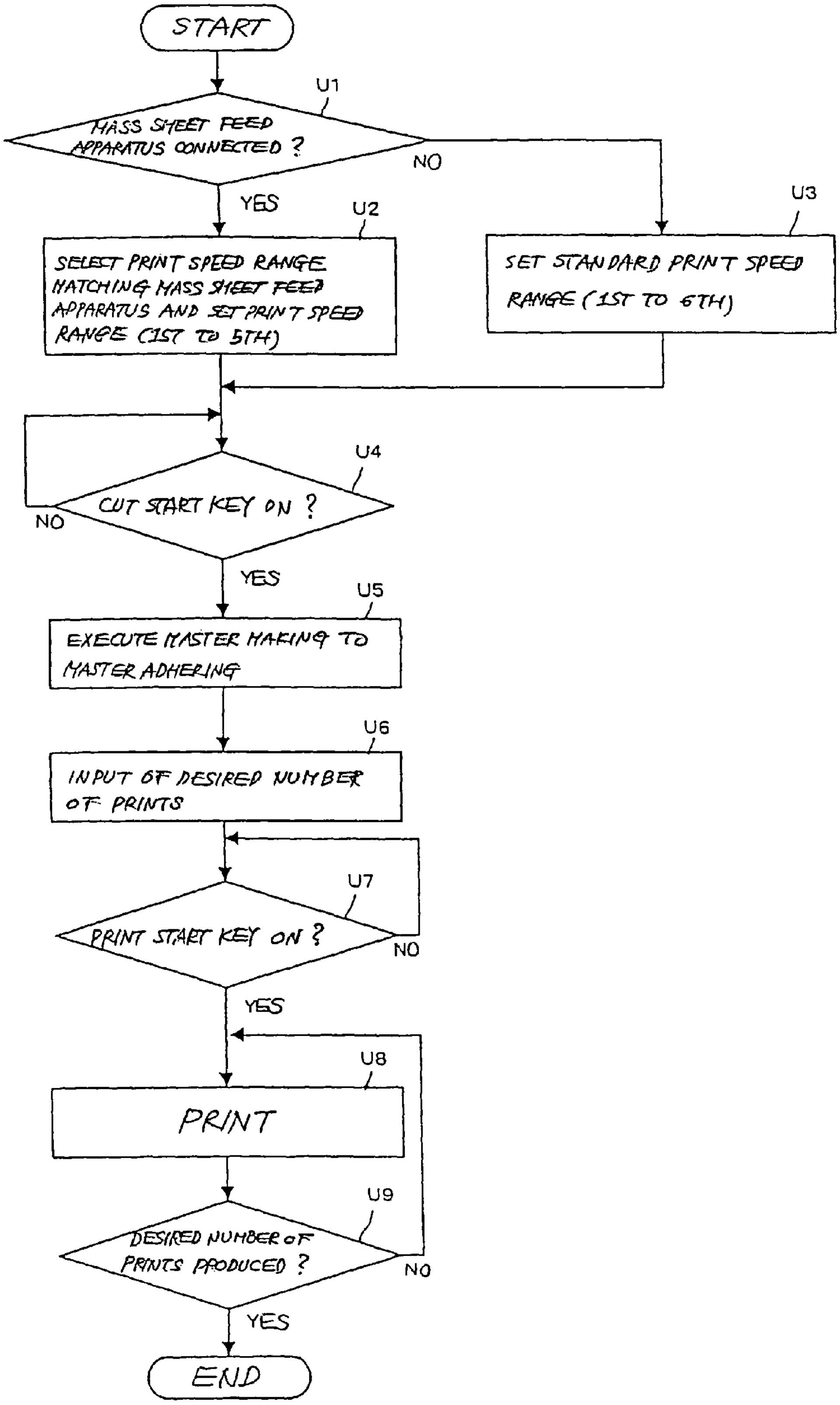

FIG. 15 shows a fourth specific routine relating to the identification of a sheet feeding apparatus and control for matching the print speed range to the sheet feeding apparatus. In this specific routine, assume that the printer 100 and mass sheet discharging apparatus 200 and mass sheet feeding apparatus 1 both are switched on beforehand.

As shown in FIG. 15, the connection identification circuit 405 determines whether or not the mass sheet feeding apparatus 1 is connected to the printer 100 (step U1). More specifically, if the mass sheet feeding apparatus 1 is connected to the printer 100, the controller 300 of the apparatus 1 sends an ID signal to the printer 100, so that the connection identification circuit 405 makes the above decision on the basis of the ID signal. If the answer of the step U1 is Y, the CPU 401 reads the print speed range information corresponding to the mass sheet feeding apparatus 1 out of the ROM 402 and then sets the print speed range of the printer 100 in accordance with the above information (step U2). More specifically, the CPU 401 writes the range of from the first speed to the fifth speed in the RAM 403 as the print speed range.

If the answer of the step U1 is N, meaning that an ID signal is not received from the mass sheet feeding apparatus 1, then the controller 400 determines that the mass apparatus 1 is not connected to the printer 1, and then advances to a step U3. In the step U3, the controller sets the standard, broadest print speed range, i.e., the first speed to the sixth speed in the RAM 403.

After the print speed range has been set in the step U2 or U3, the controller 400 determines whether or not the cut start key 151 is in an ON state (step U4). When the cut start key 151 is turned on (Y, step U4), the controller 400 executes a procedure beginning with a master making step and ending with a trial printing step and then causes the printer 100 to stop operating (step U5). Subsequently, when a desired number of prints is input on the ten keys 152 (step U6) and then the print start key 153 is turned on (step U7), the controller 400 executes printing at the print speed set in the step U2 or U3 (step U8). As a result, paper sheets P are sequentially fed from the mass sheet feeding apparatus 1 to the printer 100 and then driven out to a sheet discharging apparatus. In this specific procedure, the sheet discharging device is assumed to be a tray capable of being loaded with a usual amount of paper sheets.

More specifically, the controller 400 continuously counts the paper sheets or prints, each carrying an image thereon, output from the printer 100 with a counter, not shown, and repeats the printing operation until the count of the counter reaches the desired number of prints set on the ten keys 152 (step U9). When the count of the counter coincides with the desired number of prints (Y, step U9), the controller 400 determines that printing has ended and then ends the procedure of FIG. 15.

As stated above, when the mass sheet feeding apparatus 1 is connected to the printer 1, the controller 400 reads print speed range information matching the sheet feeding apparatus 1 out of the ROM 402 and then automatically sets a particular print speed range on the body casing 107, i.e., the printer 100 in accordance with the above information. Consequently, a print speed range, matching a sheet feeding apparatus connected to the printer 100, is automatically set to insure stable sheet discharge for thereby noticeably reducing sheet jams. Moreover, the operator does not have to input a print speed range in accordance with the sheet discharging apparatus connected to the printer 100 and can therefore easily, efficiently operate the printer 100.

<Fifth Routine>

Figure 16:
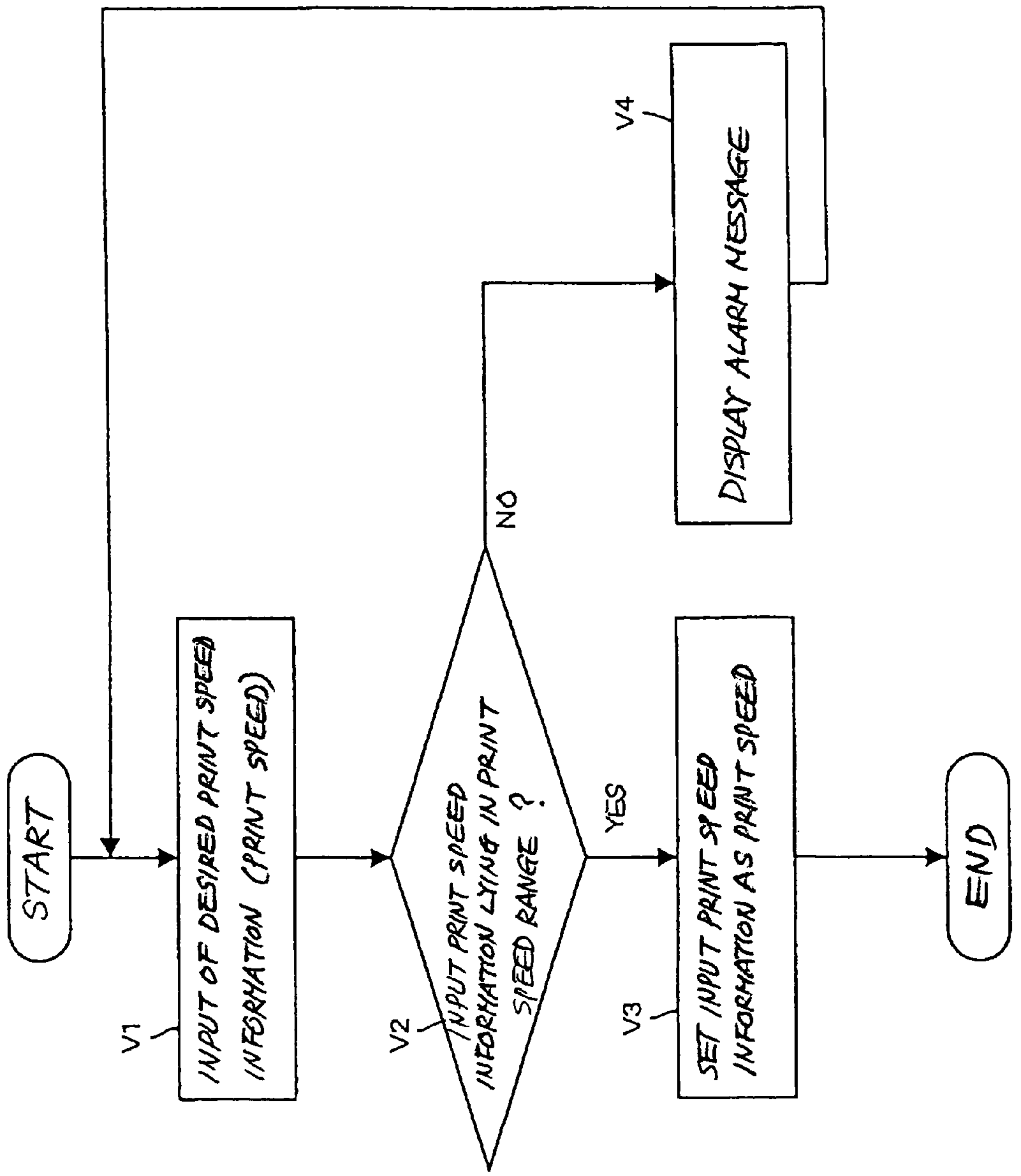

FIG. 16 demonstrates a fifth specific control routine for warning the operator of the printer against the mismatch of print speed. The fifth control routine is stored in the ROM 402 of the controller 400 and executed after a print speed range corresponding to an apparatus connected to the printer 100 has been set. For example, the fifth routine may preferably be executed before or after the step U4 of FIG. 15. Assume that the mass sheet feeding apparatus 1 is connected to the printer 100. Then, the print speed range corresponding to the mass sheet feeding apparatus 1 and ranging from the first speed to the fifth speed is automatically set on the printer 100.

As shown in FIG. 16, the operator of the printer inputs a desired print speed, e.g., the fourth print speed on the print speed key 155 of the control panel 150 (step V1). Then, the controller 400 determines whether or not the print speed information lies in the print speed range set on the printer 100 beforehand (step V2). If the answer of the step V2 is Y, meaning that the print speed information input by the operator lies in the above range (Y, step V2), the controller 400 writes the print speed selected by the operator in the RAM 403 as a print speed assigned to the printer 100 (step V3).

If the answer of the step V2 is N, e.g., if the print speed input by the operator is the sixth print speed, then the controller 400 does not write the sixth print speed in the RAM 403 because the fifth speed is the highest print speed set on the printer 100. In this case, the controller 400 displays on the LCD panel 157 a message warning that the print speed input by the operator does not match the mass sheet feeding apparatus 1 and urging the operator to change the print speed range (step T4), and then returns to the step T1. Such a procedure is repeated until the operator inputs print speed information matching the mass sheet feeding apparatus 1 on the print speed key 155 of the control panel 150.

As stated above, the fifth routine allows the operator to input a desire print speed on the print speed key 155, but displays, if the desired print speed does not match an apparatus connected to the printer 100, an alarm message on the LCD panel 157. This allows the operator to easily see that a print speed input on the print speed key 155 does not match an apparatus connected to the printer 100, thereby promoting easy, efficient operation.

<Sixth Routine>

Figure 17:
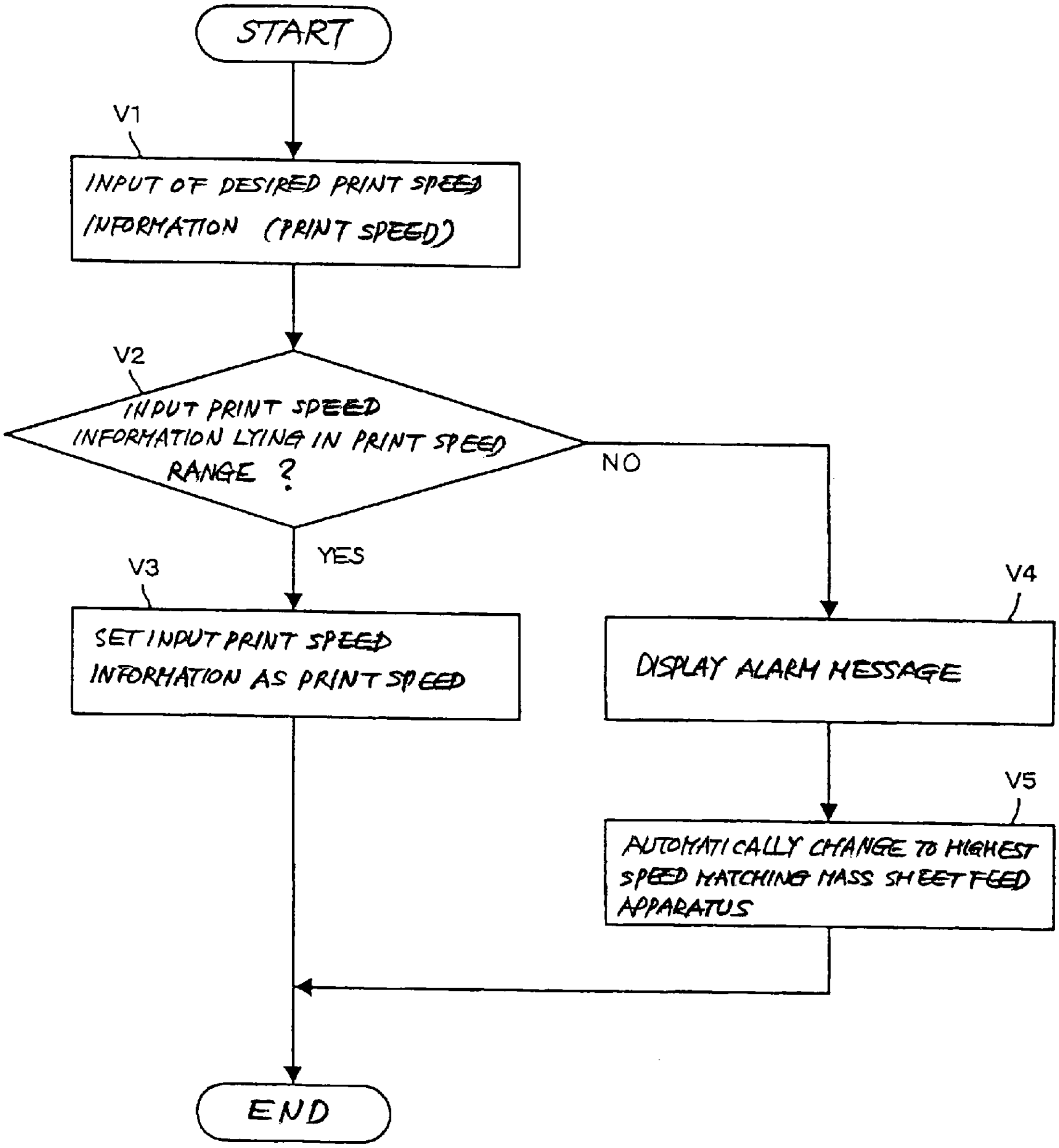

FIG. 17 shows a sixth specific control routine for warning the operator against the mismatch of print speed. In the sixth routine shown in FIG. 16, the controller 400 displays the alarm message in the step V4 and then returns to the step V1 for urging the operator to change the print speed input on the print speed key 155. By contrast, in the sixth control routine shown in FIG. 17, if the print speed input in the step T1 is the sixth or highest print speed, the controller 400, determining that the operator desires the highest print speed, executes a step V5 after displaying the alarm message in the step V4. In the step V5, the controller 400 automatically sets the fifth print speed which is the highest speed matching the mass sheet feeding apparatus 1.

As stated above, the sixth routine implements the operator's intension, i.e., printing at the highest speed as a highest speed matching an apparatus connected to the printer 100. This makes it unnecessary for the operator to change the print speed input on the print speed key 155 for thereby further promoting easy, efficient operation.

<Seventh Routine>

A seventh specific control routine to be described hereinafter is executed when the allowable print speed range differs from a sheet feeding apparatus to a sheet discharging apparatus connected to the printer 100. Taking the description made above as an example, the mass sheet feeding apparatus 1 and mass sheet discharging apparatus 200 respectively have a sheet feed speed and a sheet discharge speed both of which are adaptive to the first to fifth print speeds of the printer 1. In such a case, only if the controller 400 of the printer 100 sets the print speed range of from the first speed to the fifth speed, the mass sheet feeding apparatus 1 and mass sheet discharging apparatus 200 both are operable in combination with the printer 1. However, assume that the allowable print speed range is different between the sheet feed side and the sheet discharge side, e.g., between the mass sheet feeding apparatus 1 and the multi-tray sheet discharging apparatus 210. Then, if the print speed range of the printer 100 is matched to either one of the sheet feed side and sheet discharge side, the print speed range cannot adapt to the other side and is apt to cause a sheet jam to occur.

The seventh control routine capable of solving the problem stated above will be described with reference to FIG. 18 hereinafter. The seventh control routine is stored in the ROM 402 of the control means 400 beforehand. Assume that the printer 100 and the mass sheet feeding apparatus 1 and multi-tray sheet discharging apparatus 210 connected to the printer 100 are switched on beforehand.

Figure 18:
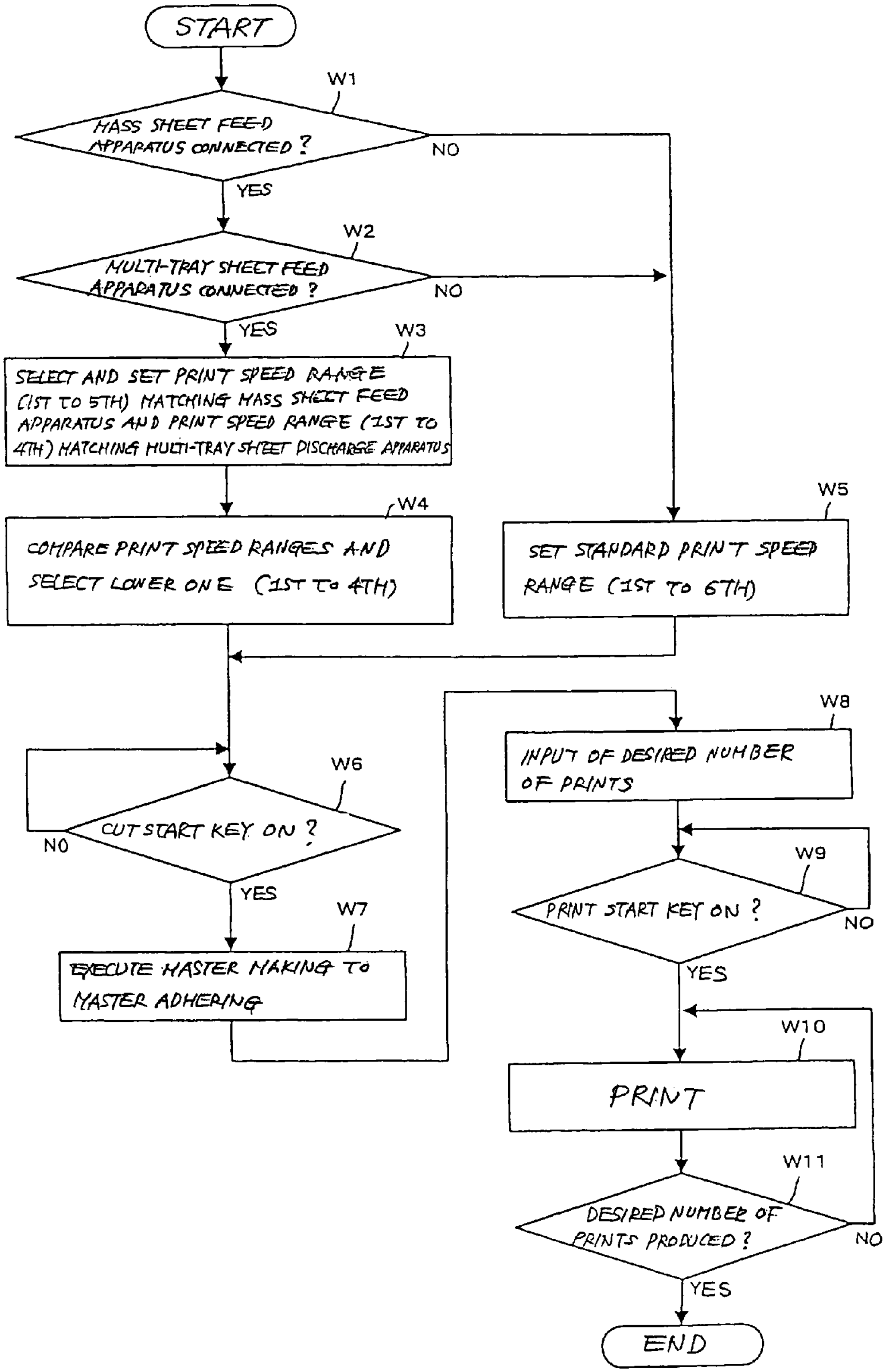

As shown in FIG. 18, the connection identification circuit 405 identifies an apparatus connected to the sheet feed side of the printer 100, e.g., determines whether or not the mass sheet feeding apparatus 1 is connected to the printer 100 (step W1). If the answer of the step W1 is Y, the connection identification circuit 405 identifies an apparatus connected to the sheet discharge side of the printer 100, e.g., determines whether or not the multi-tray sheet discharging apparatus 210 is connected to the printer 100 (step W2). More specifically, if the multi-tray sheet discharging apparatus 210 is connected to the printer 100, the controller 300 of the sheet feeding apparatus 1 and the controller 510 of the sheet discharging apparatus 210 send a respective ID signal to the printer 100 each, so that the connection identification circuit 405 makes the above decisions on the basis of the ID signals.

If the answers of the steps W1 and W2 both are Y, the CPU 401 reads the print speed range information corresponding to the mass sheet feeding apparatus 1 and print speed range information corresponding to the multi-tray sheet discharging apparatus 210 out of the ROM 402 (step W3). Subsequently, the CPU 401 compares the two different print speed range information read out of the ROM 402 so as to determine to which of them the print speed information of the printer 100 should be matched (step W4). In this specific control routine, the print speed range information of the printer 100 is matched to lower one of the print speed range information read out of the ROM 402, so that the CPU 401 writes the first to fourth speeds matching the sheet discharging apparatus 210 in the RAM 403 in place of the first to fifth speeds matching the sheet feeding apparatus 1 in the RAM 403 as a print speed range.

If the answer of the step W1 or W2 is N, meaning that the mass sheet feeding apparatus 1 or the multi-tray sheet discharging apparatus is not connected to the printer 100, the CPU 401 sets the standard print speed range of from the first speed to the sixth speed (step W5).

After the print speed range has been set in the step W4 or W5, the controller 400 determines whether or not the cut start key 151 is in an ON state (step W6). When the cut start key 151 is turned on (Y, step W6), the controller 400 executes a procedure beginning with a master making step and ending with a trial printing step and then causes the printer 100 to stop operating (step W7). Subsequently, when a desired number of prints is input on the ten keys 152 (step W8) and then the print start key 153 is turned on (step W9), the controller 400 executes printing at the print speed set in the step W4 or W5 (step W10). As a result, paper sheets are fed from the sheet feeding apparatus 1 to the printer 100 and then driven out to the sheet discharging apparatus 210 as prints.

More specifically, the controller 400 continuously counts the prints output from the printer 100 with a counter, not shown, and repeats the printing operation until the count of the counter reaches the desired number of prints set on the ten keys 152 (step W11). When the count of the counter coincides with the desired number of prints (Y, step W11), the controller 400 determines that printing has ended and then ends the procedure of FIG. 18.

As stated above, when the mass sheet feeding apparatus 1 and multi-tray sheet discharging apparatus 210 different in allowable print speed range from each other are connected to the printer 100, the controller 400 reads two print speed range information respectively corresponding to the sheet feeding apparatus 1 and sheet discharging apparatus 210 out of the ROM 402, compares them, and then matches the print speed range of the printer 100 to either one of the above information. Therefore, a print speed range matching both of the sheet feeding apparatus and sheet discharging apparatus can be set and insures stable sheet feed and sheet discharge for thereby noticeably reducing sheet jams. Moreover, the operator does not have to input a print speed range matching both of the sheet feeding apparatus and sheet discharging apparatus connected to the printer 100 and can therefore easily, efficiently operate the printer 100.

<Eighth Routine>

While the first to seventh control routines described above cause the connection identification circuit 405 to automatically identify a sheet feeding apparatus and a sheet discharging apparatus, an eighth control routine to be described hereinafter allows the operator to manually identify them.

Briefly, in the eighth routine, the ROM 402 of the controller 400 stores the types of sheet feeding apparatuses and those of sheet discharging apparatuses connectable to the printer 100 as data beforehand. When the operator presses the sheet feed key 158 or the sheet discharge key 159, a data list, listing the sheet feeding apparatuses or the sheet discharging apparatuses, appears on the LCD panel 157. Subsequently, when the operator, watching the data list, again presses the sheet feed key 158 or the sheet discharge key 159, a cursor, not shown, moves on the data list or the data being displayed is switched, allowing the operator to select a desired sheet feeding apparatus and a desired sheet discharging apparatus. Thereafter, when the operator presses, e.g., a "#" key of the ten keys 38, the contents selected are written to the RAM 403. In this routine, therefore, the controller 400 does not include the connection identification circuit 405.

Figure 19:
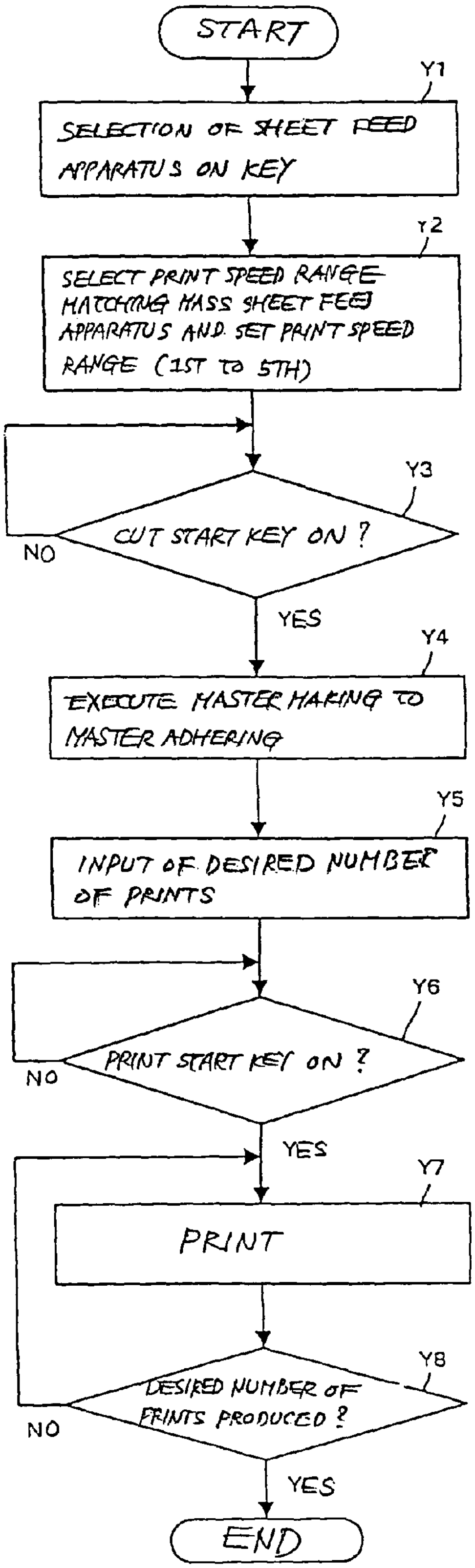
Figure 20:
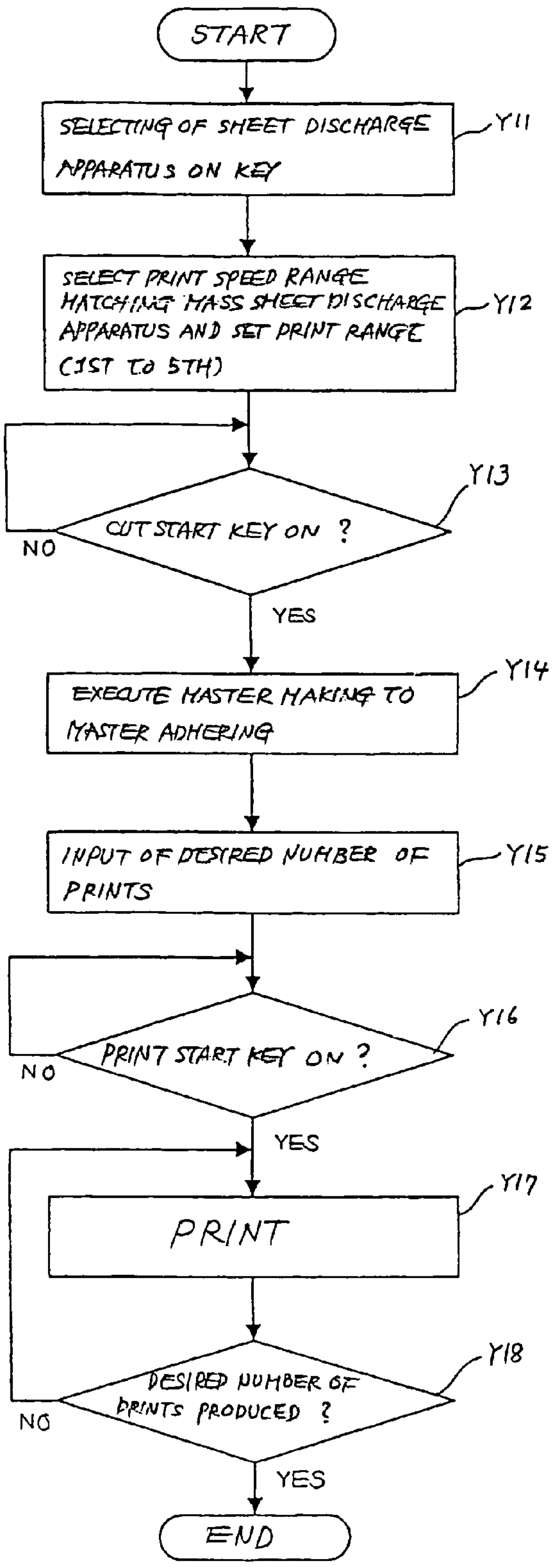
FIG. 20 is a flowchart showing a control routine forming part of the eighth routine shown in FIG. 19.

The eighth control routine will be described more specifically with reference to FIGS. 19 and 20. This control routine is stored in the ROM 402 of the control means 400 beforehand. Assume that the printer 100 is switched on beforehand. FIGS. 19 and 20 respectively demonstrate control over the manual setting of a sheet feeding apparatus and that of a sheet discharging apparatus.

As shown in FIG. 19, the operator first selects a sheet feeding apparatus on the sheet feeder key 158, e.g., the mass sheet feeding apparatus 1 (step Y1). In this case, the print speed range information particular to the mass sheet feeding apparatus 1 is read out of the ROM 402, so that the print speed range of the printer 100 is set in accordance with the above information (step Y2). More specifically, the first to the fifth print speeds are written to the RAM 403 as a print speed range.

After the print speed range has been set in the step Y2, the control means 400 determines whether or not the cut start key 151 is in an ON state (step Y3). When the cut start key 151 is turned on (Y, step Y3), the controller 400 executes a procedure beginning with a master making step and ending with a trial printing step and then causes the printer 100 to stop operating (step Y4). Subsequently, when a desired number of prints is input on the ten keys 152 (step Y5) and then the print start key 153 is turned on (step Y6), the controller 400 executes printing at the print speed set (step Y7). As a result, paper sheets are fed from the sheet feeding apparatus 1 to the printer 100 and then driven out to a sheet discharging apparatus 210 connected to the printer 100 as prints. The printing operation is repeated until the number of prints output coincides with the desired number of prints (Y, step Y8).

On the other hand, as shown in FIG. 20, when the operator selects a sheet discharging apparatus on the sheet discharge key 159, e.g., the mass sheet discharging apparatus 200 or the multi-tray sheet discharging apparatus 201 (step Y11), the print speed range information particular to the mass sheet discharging apparatus 200 or the multi-tray sheet discharging apparatus 201 is read out of the ROM 402, so that the print speed range of the printer 100 is set in accordance with the above information (step Y12). More specifically, when the mass sheet discharging apparatus 200 is selected in the step Y11, the first to the fifth print speeds are written to the RAM 403 as a print speed range in the step Y12.

After the print speed range has been set in the step Y12, the controller 400 determines whether or not the cut start key 151 is in an ON state (step Y13). When the cut start key 151 is turned on (Y, step Y13), the controller 400 executes a procedure beginning with a master making step and ending with a trial printing step and then causes the printer 100 to stop operating (step Y14). Subsequently, when a desired number of prints is input on the ten keys 152 (step Y15) and then the print start key 153 is turned on (step Y16), the controller 400 executes printing at the print speed set (step Y17) As a result, paper sheets or prints P, carrying an image thereon each, are driven out of the printer 100. The printing operation is repeated until the number of prints output coincides with the desired number of prints (Y, step Y18).

As stated above, even when the operator selects a sheet feeding apparatus or a sheet discharging apparatus to be connected to the printer 100 by hand, the controller 400 reads print speed range information corresponding to the apparatus selected by the operator out of the ROM 402 and then sets a print speed range matching the above information. It is therefore possible to set an adequate print speed range matching the sheet feeding apparatus or the sheet discharging apparatus and therefore to insure stable sheet feed or sheet discharge, thereby noticeably reducing sheet jams.

In summary, in accordance with the present invention, when a sheet feeding apparatus or a sheet discharging apparatus is connected to an apparatus body, control means sets the print speed range of the apparatus body in accordance with print speed range information corresponding to the sheet feeding apparatus or the sheet discharging apparatus and read out of storing means. It follows that an adequate print speed range matching the sheet feeding apparatus or the sheet discharging apparatus is set and insures stable sheet feed or sheet discharge, thereby reducing sheet jams. Further, the operator of the apparatus body does not have to select a print speed each time and is therefore free from troublesome operation.

Various modifications will become possible for those skilled in the art after receiving the teachings of the present disclosure without departing from the scope thereof.

What is claimed is:

1. A printer to which a plurality of sheet feeding apparatuses, each having a particular number of sheet feed speeds, are connectable, said printer comprising:

means for replacing a first sheet feeding apparatus for a second sheet feeding apparatus;

means for displaying a previously used print speed;

means for selecting a print speed;

control means for determining whether or not a print speed identifying a rate of output of sheets from the printer set before replacement of the first sheet feeding apparatus for the second sheet feeding apparatus was a highest print speed, and in response to the print speed set before replacement of the first sheet feeding apparatus is the highest print speed, the control means automatically sets the print speed to a highest print speed available for the second sheet feeding apparatus that replaces the first sheet feeding apparatus, wherein the means for displaying displays the highest print speed available for the second sheet feeding apparatus that replaces the first sheet feeding apparatus; and a control panel with which said means for replacing, said means for displaying, and said means for selecting are integrally constructed, wherein said printer comprises a stencil printer.

2. A printer to which a plurality of sheet feeding apparatuses, each having a particular number of sheet feed speeds, are connectable, said printer comprising:

a sheet feeder replacement device that replaces a first sheet feeding apparatus for a second sheet feeding apparatus;

a display device that displays a previously used print speed;

a user input that selects a print speed;

a controller that determines whether or not a print speed identifying a rate of output of sheets from the printer set before replacement of the first sheet feeding apparatus for the second sheet feeding apparatus was a highest print speed, and in response to the print speed set before replacement of the first sheet feeding apparatus is the highest print speed, the controller automatically sets the print speed to a highest print speed available for the second sheet feeding apparatus that replaces the first sheet feeding apparatus, wherein the display device displays the highest print speed available for the second sheet feeding apparatus that replaces the first sheet feeding apparatus; and a control panel with which said sheet feeder replacement device, said display device, and said user input are integrally constructed, wherein said printer comprises a stencil printer.

* * * * *